United States Patent
Yoshida et al.

(10) Patent No.: US 12,321,065 B2
(45) Date of Patent: Jun. 3, 2025

(54) LIQUID CRYSTAL DISPLAY ELEMENT

(71) Applicant: Sharp Display Technology Corporation, Kameyama (JP)

(72) Inventors: Tomonori Yoshida, Kameyama (JP); Yasuhiro Haseba, Kameyama (JP); Kimiaki Nakamura, Kameyama (JP); Koji Murata, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/089,303

(22) Filed: Dec. 27, 2022

(65) Prior Publication Data
US 2023/0205010 A1    Jun. 29, 2023

(30) Foreign Application Priority Data
Dec. 27, 2021    (JP) .................. 2021-212954

(51) Int. Cl.
*G02F 1/13357*    (2006.01)
*G02F 1/1334*    (2006.01)

(52) U.S. Cl.
CPC ...... *G02F 1/133615* (2013.01); *G02F 1/1334* (2013.01); *G02F 1/13345* (2021.01); *G02F 2201/34* (2013.01)

(58) Field of Classification Search
CPC ............... G02F 1/1334; G02F 1/13345; G02F 1/133615; G02F 2201/34; G02F 1/133553; G02B 5/10
See application file for complete search history.

(56) References Cited

U.S. PATENT DOCUMENTS

| | | | | |
|---|---|---|---|---|
| 5,999,239 A | * | 12/1999 | Larson ............... | G02B 19/0047 |
| | | | | 359/493.01 |
| 2016/0116768 A1 | | 4/2016 | Okuyama et al. | |
| 2017/0255072 A1 | * | 9/2017 | Kaneko ................. | G02F 1/137 |
| 2018/0031758 A1 | * | 2/2018 | Mizuno ................. | G02F 1/137 |
| 2018/0031875 A1 | * | 2/2018 | Qin ................... | G02F 1/133512 |
| 2018/0284540 A1 | * | 10/2018 | Wang ................. | G02B 19/0061 |
| 2019/0204632 A1 | | 7/2019 | Okuyama et al. | |
| 2020/0174294 A1 | | 6/2020 | Okuyama et al. | |
| 2021/0239897 A1 | * | 8/2021 | Wang ................. | G02F 1/13345 |
| 2022/0075216 A1 | | 3/2022 | Okuyama et al. | |

FOREIGN PATENT DOCUMENTS

| | | | | |
|---|---|---|---|---|
| CN | 202327888 U | * | 7/2012 | |
| CN | 105954933 A | * | 9/2016 | ........... G02F 1/1334 |
| JP | 2016-085452 A | | 5/2016 | |
| WO | 2013/132539 A1 | | 9/2013 | |

* cited by examiner

*Primary Examiner* — Jia X Pan
(74) *Attorney, Agent, or Firm* — ScienBiziP, P.C.

(57) ABSTRACT

Provided is a liquid crystal display element capable of switching between a transparent state and a scattering state and of reducing or preventing a decrease in luminance in the scattering state. The liquid crystal display element includes a liquid crystal panel containing a polymer-dispersed liquid crystal containing a polymer network and a liquid crystal component, and a light source module including a light source adjacent to the liquid crystal panel and a mirror configured to reflect light emitted from the light source toward the liquid crystal panel.

14 Claims, 15 Drawing Sheets

LIQUID CRYSTAL DISPLAY ELEMENT

CROSS-REFERENCE TO RELATED APPLICATIONS

The present application claims priority under 35 U.S.C. § 119 to Japanese Patent Application No. 2021-212954 filed on Dec. 27, 2021, the contents of which are incorporated herein by reference in their entirety.

BACKGROUND OF THE INVENTION

Field of the Invention

The following disclosure relates to liquid crystal display elements.

Description of Related Art

Liquid crystal display elements are display elements utilizing a liquid crystal composition to display images. In a typical display mode thereof, voltage is applied to a liquid crystal composition sealed between paired substrates such that the alignment of liquid crystal molecules in the liquid crystal composition is changed according to the applied voltage, whereby the amount of light passing through the paired substrates is controlled. Such liquid crystal display elements have advantageous features such as thin profile, light weight, and low power consumption, and are therefore used in a variety of fields.

See-through displays have drawn attention which are capable of providing display with the background of its liquid crystal display element seen through the device. Examples of see-through displays include liquid crystal display elements including a liquid crystal panel containing a polymer-dispersed liquid crystal (PDLC). A PDLC contains liquid crystal components dispersed in a polymer network. Application of voltage to the PDLC changes the alignment of the liquid crystal components and produces a difference in refractive index between the liquid crystal components and the polymer network. This difference is used to switch between a transparent state and a scattering state.

For example, JP 2016-85452 A discloses, as a technique related to a PDLC-type liquid crystal display element, a display device including a pair of transparent substrates facing each other with a space in between; a light modulation layer which is disposed between the transparent substrates, has a predetermined anisotropy of refractive index, and includes light modulation elements differing in response property to an electric field generated by electrodes provided on the transparent substrates; and a light source that applies light of a predetermined color to a side surface of the light modulation layer, wherein the light modulation layer transmits incident light from the light source when the electric field is not generated, and the light modulation layer scatters the incident light toward the transparent substrates when the electric field is generated.

BRIEF SUMMARY OF THE INVENTION

The present inventors examined a PDLC see-through display. FIG. 18 is a schematic view of a method of measuring the luminance of a liquid crystal panel. FIG. 19 is a graph showing an example of the results of measuring the luminance of a PDLC liquid crystal panel. FIG. 18 and FIG. 19 show a problem in which a conventional PDLC liquid crystal panel 11R has a lower luminance in the viewing direction as it is more apart from the light source due to anisotropically diffusing characteristics of PDLC.

An example of the light source for see-through displays is an edge-lit backlight with a light guide plate. An edge-lit backlight includes a light source on a side surface of the light guide plate. Light emitted from the light source and incident on the side surface of the light guide plate is reflected in the light guide plate multiple times, and then emitted from the front surface. In contrast, part of the light reflected in the light guide plate is lost due to diffraction and absorption by the components of the liquid crystal panel, such as thin film transistors (TFTs) and alignment films. Accordingly, more light is lost at a position farther from the light source, which leads to reduced front characteristics such as the contrast ratio and the luminance in the central portion of the display screen.

In JP 2016-85452 A, the liquid crystal panel includes PDLC as a light modulation layer and unfortunately the luminance in the viewing direction is lower at a position farther from the light source. Also, in JP 2016-85452 A, light is guided from an edge-lit backlight into the PDLC. This causes loss of light due to a factor such as diffraction or scattering by the TFTs or polymer-dispersed liquid crystal inside the liquid crystal panel. Thus, light from the side of the liquid crystal panel may be significantly attenuated as it travels toward the central portion of the liquid crystal panel, resulting in an insufficient luminance in the panel central portion.

An example of the see-through display is a box-type see-through display shown in FIG. 20. FIG. 20 is a schematic perspective view of an example of a box-type see-through display. A box-type see-through display 1RB shown in FIG. 20 includes a field sequential color (FSC) driven light source and a transmissive liquid crystal panel. Specifically, the box-type see-through display 1RB includes an LED light source 21XR that is provided at an upper portion of a box 2R and that includes red (R), green (G), and blue (B) light-emitting diodes (LED). Light diffusely reflected on the wall surface of the box 2R serves as a light source to switch the mode of the liquid crystal panel 11R between a transmissive mode and a non-transmissive mode.

The box-type see-through display 1RB allows a sample placed in the box 2R to be observed by a viewer while an image displayed on the liquid crystal panel 11R is superposed on the sample. However, when the light reflected on the sample in the box 2R has a low intensity or when the sample has a specific color, high luminance full-color display may not be achieved when the display is superposed on the sample.

In response to the above issues, an object of the present invention is to provide a liquid crystal display element capable of switching between a transparent state and a scattering state and of reducing or preventing a decrease in luminance in the scattering state.

(1) One embodiment of the present invention is directed to a liquid crystal display element including: a liquid crystal panel containing a polymer-dispersed liquid crystal containing a polymer network and a liquid crystal component; and a light source module including a light source adjacent to the liquid crystal panel and a mirror configured to reflect light emitted from the light source toward the liquid crystal panel.

(2) In an embodiment of the present invention, the liquid crystal display element includes the structure (1), and the light source module faces a first end portion of paired opposite end portions of the liquid crystal panel.

(3) In an embodiment of the present invention, the liquid crystal display element includes the structure (2), and the light source is a first light source, the mirror is a first mirror, the light source module is a first light source module, and the liquid crystal display element further includes a second light source module, the second light source module including:

a second light source adjacent to the liquid crystal panel and facing a second end portion of the paired opposite end portions; and a second mirror configured to reflect light emitted from the second light source toward the liquid crystal panel.

(4) In an embodiment of the present invention, the liquid crystal display element includes the structure (2), and the light source is a first light source, the mirror is a first mirror, the light source module is a first light source module, and the liquid crystal display element further includes a third light source module, the third light source module including:

a third mirror adjacent to the liquid crystal panel, facing a second end portion of the paired opposite end portions, and configured to reflect light incident thereon toward the liquid crystal panel; and no light source.

(5) In an embodiment of the present invention, the liquid crystal display element includes the structure (1), (2), (3), or (4), and the mirror is a continuous freeform surface mirror.

(6) In an embodiment of the present invention, the liquid crystal display element includes the structure (1), (2), (3), (4), or (5), and the mirror has a shape expressed by two or more independent functions.

(7) In an embodiment of the present invention, the liquid crystal display element includes the structure (1), (2), (3), (4), (5), or (6), and the mirror has a shape expressed by three or more independent functions.

(8) In an embodiment of the present invention, the liquid crystal display element includes the structure (1), (2), (3), (4), (5), (6), or (7), and the mirror includes a collimator configured to collimate a Lambertian light source, a first light distributor, and a second light distributor, provided that a thickness direction, an in-plane horizontal direction, and an in-plane vertical direction of the liquid crystal panel respectively correspond to an x-axis direction, a y-axis direction, and a z-axis direction, the collimator is away from the liquid crystal panel in the z-axis direction; the first light distributor is more away from the liquid crystal panel than the collimator in the x-axis direction; and the second light distributor is more away from the liquid crystal panel than the first light distributor in the x-axis direction, 30% or more and 60% or less of a total luminous flux collimated is applied to the first light distributor, and 40% or more and 100% or less of a luminous flux collimated and applied to the first light distributor is applied to the liquid crystal panel, and 40% or more and 70% or less of the total luminous flux collimated, which corresponds to a luminous flux collimated and not applied to the first light distributor, is applied to the second light distributor, and 40% or more and 100% or less of a luminous flux collimated and applied to the second light distributor is applied to the liquid crystal panel.

(9) In an embodiment of the present invention, the liquid crystal display element includes the structure (1), (2), (3), (4), (5), (6), or (7), and the mirror includes a collimator configured to collimate a Lambertian light source, a first light distributor, and a second light distributor, provided that a thickness direction, an in-plane horizontal direction, and an in-plane vertical direction of the liquid crystal panel respectively correspond to an x-axis direction, a y-axis direction, and a z-axis direction, the collimator is away from the liquid crystal panel in the z-axis direction; the second light distributor is more away from the liquid crystal panel than the collimator in the x-axis direction; and the first light distributor is more away from the liquid crystal panel than the second light distributor in the x-axis direction, 30% or more and 60% or less of a total luminous flux collimated is applied to the second light distributor, and 40% or more and 100% or less of a luminous flux collimated and applied to the second light distributor is applied to the liquid crystal panel, and 40% or more and 70% or less of the total luminous flux collimated, which corresponds to a luminous flux collimated and not applied to the second light distributor, is applied to the first light distributor, and 40% or more and 100% or less of a luminous flux collimated and applied to the first light distributor is applied to the liquid crystal panel.

(10) In an embodiment of the present invention, the liquid crystal display element includes the structure (8) or (9), and an amount of light applied from the first light distributor to the liquid crystal panel reaches a maximum within a range of 60% from the first end portion of the liquid crystal panel adjacent to the light source module, and an amount of light applied from the second light distributor to the liquid crystal panel reaches a maximum within a range of 50% from the second end portion of the liquid crystal panel opposite to the first end portion adjacent to the light source module.

(11) In an embodiment of the present invention, the liquid crystal display element includes the structure (1), (2), (3), (4), (5), (6), (7), (8), (9), or (10), and the mirror includes a collimator configured to collimate a Lambertian light source, a first light distributor, and a second light distributor, and provided that a thickness direction, an in-plane horizontal direction, and an in-plane vertical direction of the liquid crystal panel respectively correspond to an x-axis direction, a y-axis direction, and a z-axis direction, that the liquid crystal panel has a length A (mm) in the z-axis direction, that a point of the light source module having the smallest distance relative to the liquid crystal panel has module-relative coordinates (x, z)=(0, 0), and that the module-relative coordinates are expressed by a unit of mm, the light source, the collimator, the first light distributor, and the second light distributor respectively have module-relative coordinates $(x_1, z_1)$, $(x_2, z_2)$, $(x_3, z_3)$, and $(x_4, z_4)$ satisfying the following Formula 1 to Formula 15:

$$(x_1, z_1) = (x_e, 0) \qquad \text{(Formula 1)}$$

$$z_2 = (4 \times x_e \times x_2)^{0.5} \qquad \text{(Formula 2)}$$

$$z_3 = -(4 \times a \times x_3)^{0.5} + (b \times x_3) + \alpha \qquad \text{(Formula 3)}$$

$$z_4 = -(4 \times c \times x_4)^{0.5} + (d \times x_4) + \beta \qquad \text{(Formula 4)}$$

$$1 \times (A/300) \le x_e \le 30 \times (A/300) \qquad \text{(Formula 5)}$$

$$0 \le x_1 \le 60 \times (A/300) \qquad \text{(Formula 6)}$$

$$30 \times (A/300) \le x_2 \le 80 \times (A/300) \qquad \text{(Formula 7)}$$

$$45 \times (A/300) \le x_3 \le 90 \times (A/300) \qquad \text{(Formula 8)}$$

$$55 \times (A/300) \le x_4 \le 90 \times (A/300) \qquad \text{(Formula 9)}$$

$$0 \le a \le 50 \qquad \text{(Formula 10)}$$

$$-10 \le b \le 10 \qquad \text{(Formula 11)}$$

$$0 \le c \le 50 \qquad \text{(Formula 12)}$$

$$-10 \leq d \leq 10 \quad \text{(Formula 13)}$$

$$0 \times (A/300) \leq \alpha \leq 100 \times (A/300) \quad \text{(Formula 14)}$$

$$0 \times (A/300) \leq \beta \leq 100 \times (A/300) \quad \text{(Formula 15)}.$$

(12) In an embodiment of the present invention, the liquid crystal display element includes the structure (11), and the mirror further includes a third light distributor, and the third light distributor has module-relative coordinates $(x_5, z_5)$ satisfying the following Formula 16 to Formula 19:

$$z_5 = -(4 \times e \times x_5)^{0.5} + (f \times x_5) + \gamma \quad \text{(Formula 16)}$$

$$0 \leq e \leq 50 \quad \text{(Formula 17)}$$

$$-10 \leq f \leq 10 \quad \text{(Formula 18)}$$

$$0 \times (A/300) \leq \gamma \leq 100 \times (A/300) \quad \text{(Formula 19)}.$$

(13) In an embodiment of the present invention, the liquid crystal display element includes the structure (1), (2), (3), (4), (5), (6), (7), (8), (9), (10), (11), or (12), and provided that a thickness direction, an in-plane horizontal direction, and an in-plane vertical direction of the liquid crystal panel respectively correspond to an x-axis direction, a y-axis direction, and a z-axis direction, and that a point of the light source module having a smallest distance relative to the liquid crystal panel has module-relative coordinates (x, z)=(0, 0), the light source module includes a diffuser having a haze of 1% or higher and 40% or lower in an plane satisfying z=0.

(14) In an embodiment of the present invention, the liquid crystal display element includes the structure (13), and the diffuser is provided on a back surface side of the liquid crystal panel.

The present invention can provide a liquid crystal display element capable of switching between a transparent state and a scattering state and of reducing or preventing a decrease in luminance in the scattering state.

DETAILED DESCRIPTION OF THE INVENTION

The present invention is described below in more detail based on embodiments with reference to the drawings. The embodiments, however, are not intended to limit the scope of the present invention.

DEFINITION OF TERMS

Herein, a "viewing surface side" means a side closer to the screen (display surface) of a liquid crystal panel, and a "back surface side" means a side farther from the screen (display surface) of a liquid crystal panel.

Embodiment 1

Figure 1:
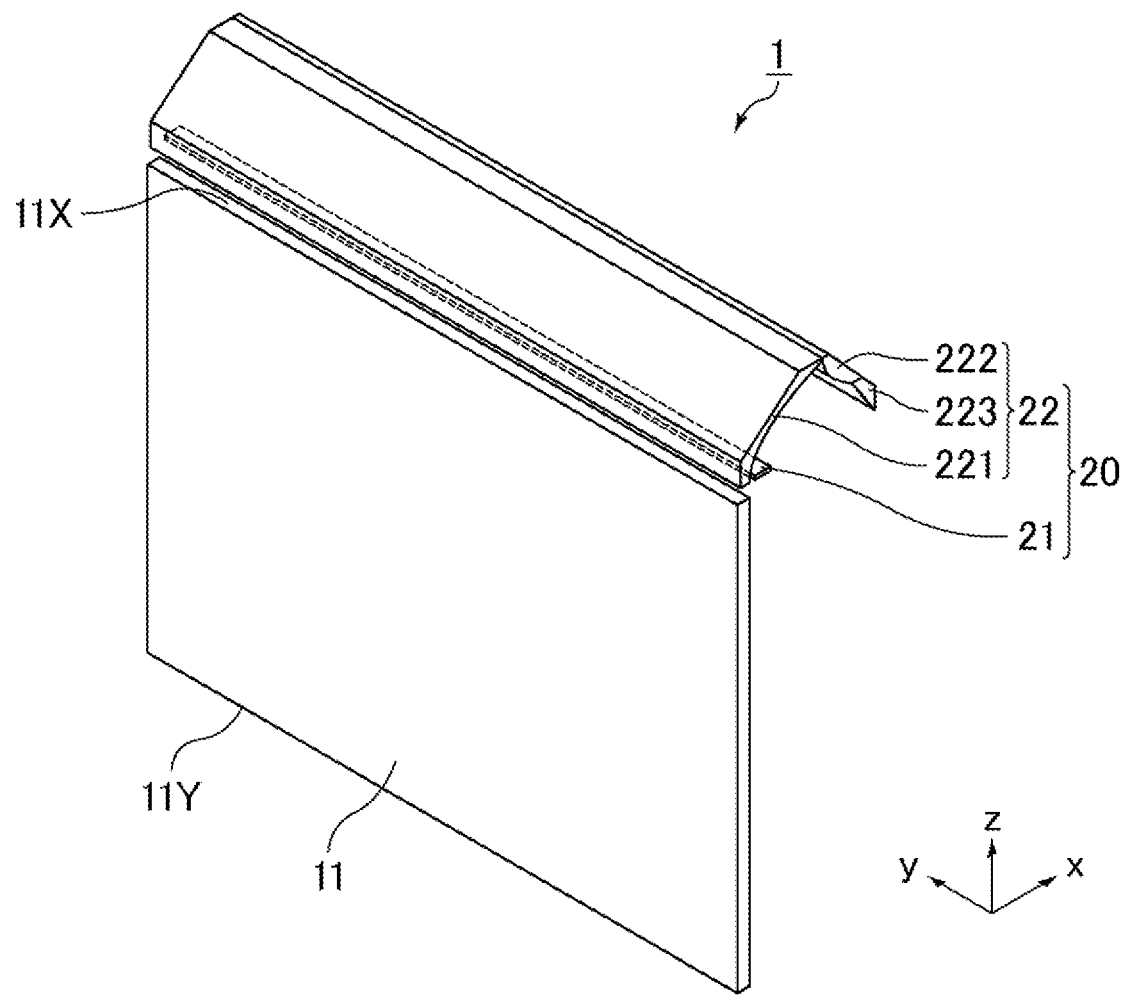
FIG. 1 is a schematic perspective view of a liquid crystal display element of Embodiment 1.
Figure 2:
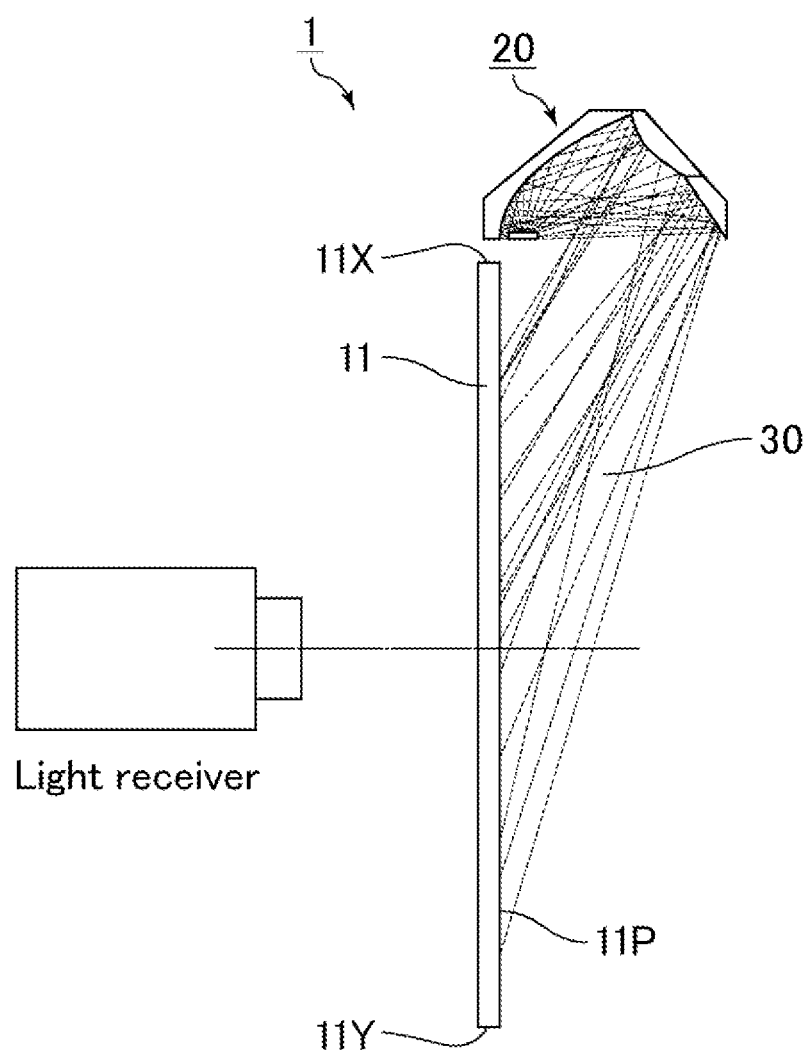
FIG. 2 is a schematic view of light emitted from a light source module in the liquid crystal display element of Embodiment 1.
Figure 3:
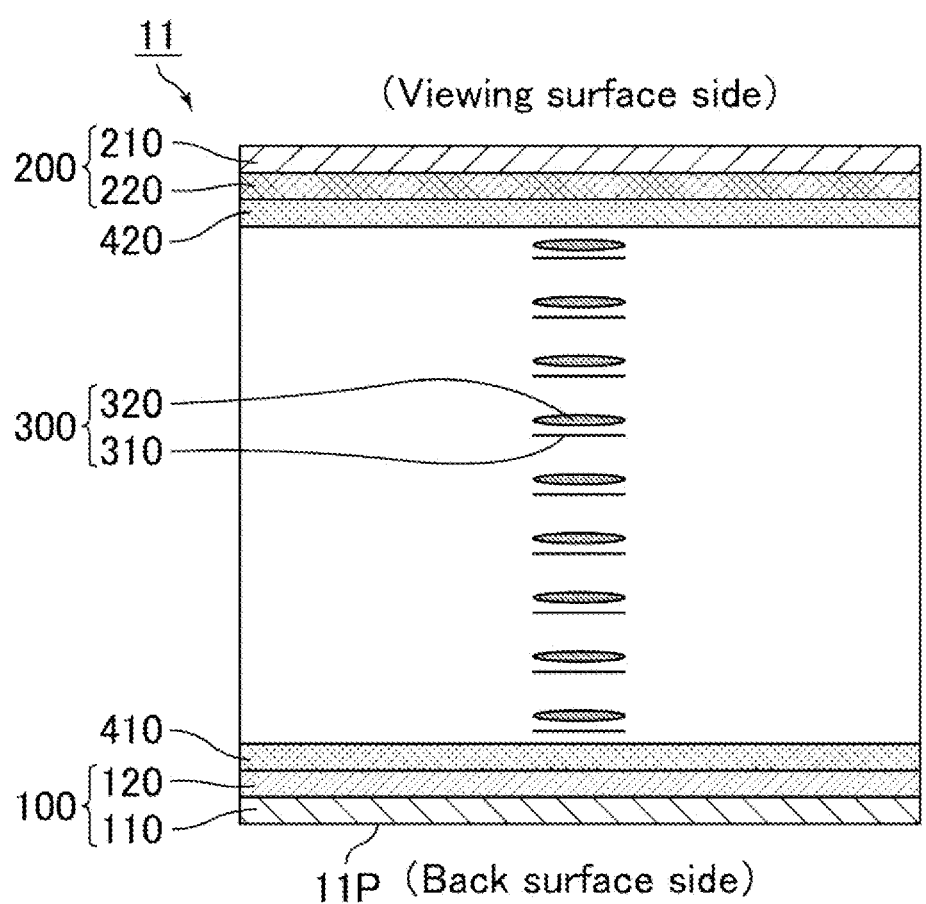
FIG. 3 is a schematic cross-sectional view of a liquid crystal panel in the liquid crystal display element of Embodiment 1 in a transparent state.
Figure 4:
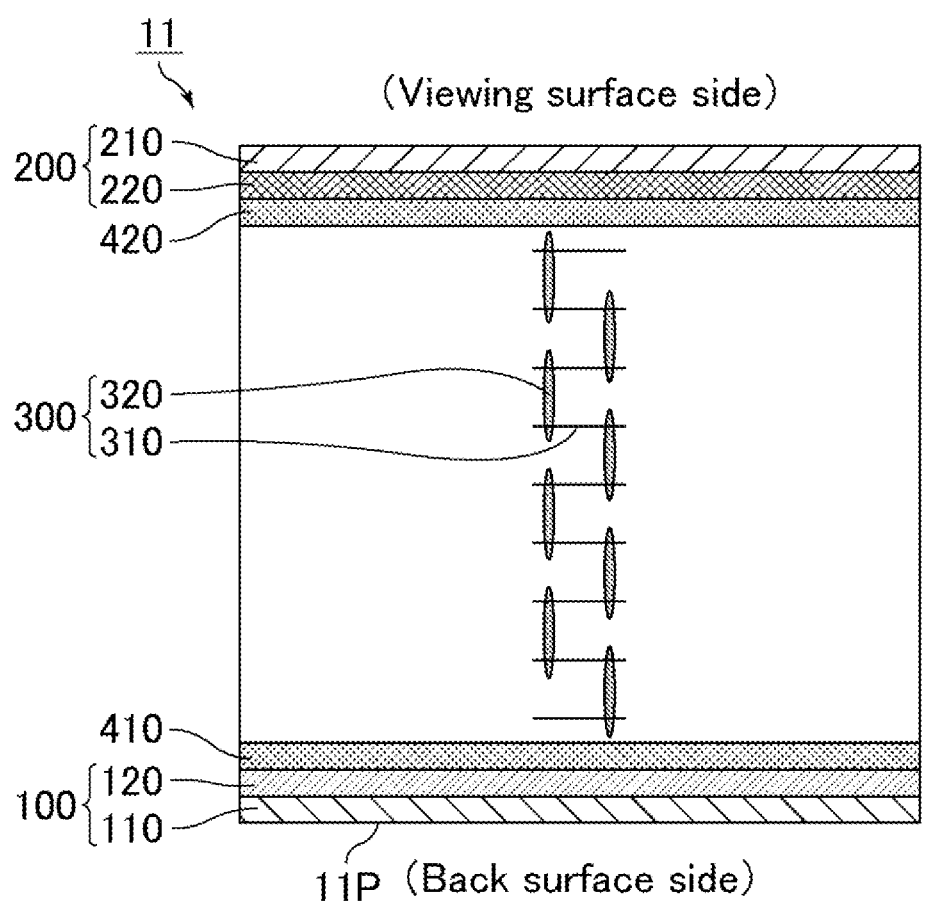
FIG. 4 is a schematic cross-sectional view of the liquid crystal panel in the liquid crystal display element of Embodiment 1 in a scattering state.

FIG. 1 is a schematic perspective view of a liquid crystal display element of Embodiment 1. FIG. 2 is a schematic view of light emitted from a light source module in the liquid crystal display element of Embodiment 1. FIG. 3 is a schematic cross-sectional view of a liquid crystal panel in the liquid crystal display element of Embodiment 1 in a transparent state. FIG. 4 is a schematic cross-sectional view of the liquid crystal panel in the liquid crystal display element of Embodiment 1 in a scattering state.

As shown in FIG. 1 to FIG. 4, a liquid crystal display element 1 of the present embodiment includes a liquid crystal panel 11 containing polymer-dispersed liquid crystal 300 containing a polymer network 310 and a liquid crystal component 320. This mode enables switching between the transparent state and the scattering state. This mode also enables image display without a polarizer, reducing or preventing a decrease in transmittance in the transparent state.

The liquid crystal display element 1 of the present embodiment includes a light source module 20 including a light source 21 adjacent to the liquid crystal panel 11 and a mirror 22 configured to reflect light emitted from the light source 21 toward the liquid crystal panel 11. Specifically, when the display surface of the rectangular liquid crystal panel 11 is observed in the x-axis direction (direction from the viewing surface side to the back surface side) in FIG. 1, the light source 21 is provided adjacent to the liquid crystal panel 11 along the y-axis direction of the liquid crystal panel 11 (the longitudinal direction of the liquid crystal panel 11). This mode can achieve a high irradiance in a region far from the light source 21 owing to light distribution by the mirror 22, reducing or preventing an increase in power consumption and reducing or preventing a decrease in luminance in the scattering state in a region far from the light source module 20 in the plane of the liquid crystal panel 11. As a result, the luminance distribution in the plane can have an increased uniformity. For example, a decrease in luminance at the central portion of the screen can be reduced or prevented. Accordingly, the light source module 20 in the liquid crystal display element 1 of the present embodiment can optimize the irradiance of light applied to the surface of the liquid crystal panel 11.

The display device of JP 2016-85452 A uses a backlight including a light guide plate and a light source to illuminate a see-through panel. In contrast, the liquid crystal display element 1 of the present embodiment has a structure different from that of JP 2016-85452 A in that no light guide plate is used and the light source module 20 includes the light source 21 and the mirror 22. The liquid crystal display element 1 of the present embodiment achieves an increased irradiance in a region with a great lighting angle, i.e., a region far from the light source 21, owing to light distribution by the mirror 22. Thus, the present embodiment enables a higher luminance uniformity in the plane with a smaller power consumption than JP 2016-85452 A while maintaining a thin profile and a high transmittance, resulting in a see-through display providing a high luminance.

As described above, the box-type see-through display 1RB includes the LED light source 21XR at an upper portion of the box 2R and light diffusely reflected on the wall surface of the box 2R serves as a light source to switch between the transmissive mode and the non-transmissive mode in the liquid crystal panel 11R. In contrast, the present embodiment uses the liquid crystal panel 11 capable of switching between the scattering state and the transmissive state. Thus, when voltage is applied to the polymer-dispersed liquid crystal 300 in the liquid crystal panel 11 and light emitted from the light source 21 is scattered into the liquid crystal panel 11 is scattered, the light is emitted toward the front (a region where a viewer can visually observe the light). When no voltage is applied to the polymer-dispersed liquid crystal 300 and light emitted from the light source 21 to the liquid crystal panel 11 is transmitted, the light travels into a region where a viewer cannot visually confirm the light. Accordingly, the box-type see-through display and the liquid crystal display element 1 of the present embodiment are different in structure.

The wall surface of the box-type see-through display 1RB is preferably white. The liquid crystal display element 1 of the present embodiment may have no wall surface because it can function without reflection of light on the wall surface. In the case of using the liquid crystal display element 1 of the present embodiment for a box-type see-through display, the wall surface is preferably black because the color may be inverted if light reflected on the wall surface has a higher intensity than light scattered by the polymer-dispersed liquid crystal.

The box-type see-through display 1RB essentially includes a polarizer and thus has a transmittance of about 20%. In contrast, the liquid crystal display element 1 of the present embodiment requires no polarizer and thus can achieve a high transmittance (e.g., 60%).

Also, as described above, the box-type see-through display 1RB cannot achieve high luminance full-color display when the display is superposed on a sample when light reflected on the sample in the box 2R has a low intensity or when the sample has a specific color. In contrast, the liquid crystal display element 1 of the present embodiment enables superposition of color display on the entire surface of the sample regardless of the color of the sample. The present embodiment is described in detail below.

As shown in FIG. 3 and FIG. 4, the liquid crystal panel 11 includes, sequentially from the back surface side toward the viewing surface side, a first substrate 100, the polymer-dispersed liquid crystal 300, and a second substrate 200. The first substrate 100 includes a first support substrate 110 and a pixel electrode 120. The second substrate 200 includes a second support substrate 210 and a common electrode 220.

The liquid crystal panel 11 preferably includes thin film transistors (TFTs). Light emitted from the light source module 20 may be attenuated in some cases due to a factor such as diffraction or scattering by the TFTs inside the liquid crystal panel. In the liquid crystal display element 1 of the present embodiment, the light source module 20, which is adjacent to the liquid crystal panel 11 and includes the light source 21 and the mirror 22, emits light toward the liquid crystal panel 11 through an air layer 30, in other words, the air layer 30 is present between the plane of emission and the plane of incidence of the liquid crystal panel 11. Thus, the liquid crystal panel 11, even when it includes TFTs, can reduce the aforementioned attenuation of light due to TFTs and can effectively reduce or prevent a decrease in luminance of the panel central portion in the scattering state. In contrast, a conventional liquid crystal panel includes a light guide plate containing, for example, an acrylic resin between the plane of emission and the plane of incidence of the liquid crystal panel and thus is different in structure from the present embodiment. The following describes a mode in which the liquid crystal panel 11 (particularly, the first substrate 100) includes TFTs, but the liquid crystal display element is not limited thereto.

The first substrate 100 includes TFTs which are switching elements used to switch the pixels between ON and OFF in the liquid crystal panel 11. In the present embodiment, the structure of the first substrate 100 for a TN mode is described.

The first substrate 100 includes, sequentially from the back surface side toward the viewing surface side, the first support substrate 110, parallel gate lines, a gate insulating film, parallel source lines extending in a direction in which they intersect the gate lines, an interlayer insulating film, and the pixel electrodes 120. The gate lines and the source lines are arranged in a grid pattern that defines the pixels. The TFTs serving as switching elements are provided at the respective intersections of the gate lines and the source lines. Each region surrounded by adjacent two gate lines and adjacent two source lines is provided with a pixel electrode 120.

Each TFT is a three-terminal switch that is connected to the corresponding gate line and the corresponding source line, and includes a gate electrode that protrudes from (is part of) the corresponding gate line, a source electrode that protrudes from (is part of) the corresponding source line, a drain electrode connected to the corresponding pixel electrode among the pixel electrodes, and a thin film semiconductor layer. The source electrode and the drain electrode are disposed in the same source line layer as the source lines. The gate electrode is disposed in the same gate line layer as the gate lines.

The thin-film semiconductor layer of each TFT is formed from, for example, a high-resistant semiconductor layer containing a component such as amorphous silicon or polysilicon, and a low-resistant semiconductor layer containing a component such as n+ amorphous silicon, i.e., amorphous silicon doped with an impurity such as phosphorus. The thin-film semiconductor layer may be an oxide semiconductor layer containing, for example, zinc oxide. Examples of the oxide semiconductor layer include an In—Ga—Zn—O (indium gallium zinc oxide) layer which is an oxide semiconductor layer containing indium (In), gallium (Ga), zinc (Zn), and oxygen (O) as the main components. Such In—Ga—Zn—O-TFTs can provide an effect of increasing the resolution and an effect of reducing the power consumption, as well as a higher writing speed than that in conventional display devices. The same effects can be achieved also when an oxide semiconductor layer is used which contains at least one selected from indium, gallium, zinc, copper (Cu), silicon (Si), tin (Sn), aluminum (Al), calcium (Ca), germanium (Ge), and lead (Pb).

The first support substrate 110 and the second support substrate 210 are preferably transparent substrates. Examples thereof include glass substrates and plastic substrates.

The gate insulating film is, for example, an inorganic insulating film. The inorganic insulating film used may be, for example, an inorganic film (relative dielectric constant $\varepsilon=5$ to 7) such as a silicon nitride ($SiN_x$) film or a silicon oxide ($SiO_2$) film, or a laminate of any of these films.

The gate line layer and the source line layer are each, for example, a single layer or a multi-layer of a metal such as copper, titanium, aluminum, molybdenum, or tungsten, or an alloy of any of these metals. The gate lines, the source lines, and the conductive lines and electrodes of the TFTs are formed by forming a single or multi-layer of a metal such as copper, titanium, aluminum, molybdenum, or tungsten, or an alloy of any of these metals by a technique such as sputtering, and patterning the layer(s) by a technique such as photolithography. Those to be in the same layer among the lines and electrodes may be formed from the same material for efficient production.

The interlayer insulating film is, for example, an inorganic insulating film. The inorganic insulating film used may be, for example, an inorganic film (relative dielectric constant=5 to 7) such as a silicon nitride ($SiN_x$) film or a silicon oxide ($SiO_2$) film, or a laminate of any of these films.

The pixel electrodes 120 are each a planar (solid) electrode disposed in a corresponding region surrounded by adjacent two gate lines and adjacent two source lines. Each pixel electrode 120 is electrically connected to the corresponding source line via the thin film semiconductor layer of the corresponding TFT. The pixel electrode 120 is set at an electrical potential corresponding to the data signal supplied via the corresponding TFT.

The common electrode 220 is formed on almost the entire surface across the boundaries of the pixels. A common signal of a constant value is supplied to the common electrode 220, so that the common electrode 220 is maintained at a constant electrical potential.

The pixel electrodes 120 and the common electrode 220 may be formed from, for example, indium tin oxide (ITO) or indium zinc oxide (IZO).

The polymer-dispersed liquid crystal 300 contains the polymer network 310 and the liquid crystal component 320 and is sandwiched between the first substrate 100 and the second substrate 200. In the polymer-dispersed liquid crystal 300, fibrous matrices of a cured product of a photopolymerizable liquid crystal compound are aggregated to form the three-dimensionally continuous polymer network 310, and the liquid crystal component 320 is phase-separated and dispersed within the polymer network 310.

The polymer-dispersed liquid crystal 300 contains the polymer network 310 formed from a cured product of a photopolymerizable liquid crystal compound, and the liquid crystal component 320. The polymer-dispersed liquid crystal 300 is in the transparent state with no voltage applied while it is in the scattering state with voltage applied. This mode enables a display element that uses no polarizer. Specifically, the polymer-dispersed liquid crystal 300 is in the transparent state with no voltage applied, and shifts into the scattering state as the alignment of the liquid crystal component 320 is changed with voltage applied.

The state "with no voltage applied" means the period during which the voltage applied to the polymer-dispersed liquid crystal 300 is lower than the threshold voltage (including no voltage application). The state "with voltage applied" means the period during which the voltage applied to the polymer-dispersed liquid crystal 300 is equal to or higher than the threshold voltage. The state with no voltage applied is also referred as when no voltage is applied, while the state with voltage applied is also referred to as when voltage is applied.

Hereinafter, the alignment of the liquid crystal component 320 in the transparent state and that in the scattering state are described with reference to FIG. 3 and FIG. 4. FIG. 3 and FIG. 4 show the central portion of the liquid crystal panel 11.

As shown in FIG. 3, with no voltage applied, preferably, the alignment azimuths of the polymer network 310 and the liquid crystal component 320 are substantially the same as each other. FIG. 3 shows a case where both the polymer network 310 and the liquid crystal component 320 are homogeneously aligned relative to the main surfaces of the first substrate 100 and the second substrate 200. With no voltage applied, there are substantially no difference in extraordinary refractive index ne between the liquid crystal component 320 and the polymer network 310 and substantially no difference in ordinary refractive index no between the liquid crystal component 320 and the polymer network 310 in all directions including the thickness direction of the polymer-dispersed liquid crystal 300. Thus, light emitted from the light source module 20 passes through the polymer-dispersed liquid crystal 300, so that the liquid crystal panel is in the transparent state. Such a state where there are substantially no difference in extraordinary refractive index ne between the liquid crystal component 320 and the polymer network 310 and substantially no difference in ordinary refractive index no between the liquid crystal component 320 and the polymer network 310 in all directions including the thickness direction of the polymer-dispersed liquid crystal 300 is also considered as a state where the refractive index of the liquid crystal component 320 and that of the polymer network 310 match to each other.

The transparent state is a state of being transparent to light. For example, the polymer-dispersed liquid crystal 300 in the transparent state may have a transmittance of 80% or higher or 90% or higher. The upper limit of the transmittance of the polymer-dispersed liquid crystal 300 in the transparent state may be 100%, for example. In the present embodiment, the polymer-dispersed liquid crystal 300 in the transparent state is transparent to visible light. Herein, the transmittance of the polymer-dispersed liquid crystal in the transparent state refers to the parallel light transmittance of the polymer-dispersed liquid crystal in the transparent state. The transmittance of the polymer-dispersed liquid crystal in the transparent state can be measured in the following manner, for example. The luminance is measured using a spectroradiometer (SR-UL1) available from Topcon Technohouse Corp. at a light acceptance angle of 2° when a liquid crystal panel including a polymer-dispersed liquid crystal with no voltage applied is placed on a common backlight including a halogen lamp as a light source (i.e., light source for liquid crystal display elements) and when nothing is placed on the backlight. The measurement wavelength is about 550 nm, which is the wavelength at which the luminous reflectance Y value representing the visual sensitivity of the human eye is highest. The luminance measured when the liquid crystal panel with no voltage applied is placed on the backlight is divided by the luminance measured when nothing is placed on the backlight, so that the transmittance of the polymer-dispersed liquid crystal in the transparent state can be determined.

As shown in FIG. 4, with voltage applied, the molecules of the polymer network 310 are aligned horizontally to the main surfaces of the first substrate 100 and the second substrate 200, while the molecules of the liquid crystal component 320 are aligned in the direction vertical to the surfaces of the first substrate 100 and the second substrate 200. With voltage applied, electric fields generated in the polymer-dispersed liquid crystal 300 change the alignment azimuth of the liquid crystal component 320, while having no influence on the polymer network 310. Thus, the difference in extraordinary refractive index ne between the liquid crystal component 320 and the polymer network 310 and the difference in ordinary refractive index no between the liquid crystal component 320 and the polymer network 310 are large in all directions including the thickness direction of the polymer-dispersed liquid crystal 300. Unpolarized light emitted from the light source module 20 and obliquely incident on the polymer-dispersed liquid crystal 300 is scattered without dependence on polarization differently from the case where the unpolarized light is vertically incident on the polymer-dispersed liquid crystal 300, so that the polymer-dispersed liquid crystal 300 is in a highly scattering state. Such a state where the difference in extraordinary refractive index ne between the liquid crystal component 320 and the polymer network 310 and the difference in ordinary refractive index no between the liquid crystal component 320 and the polymer network 310 are large in all directions including the thickness direction of the polymer-dispersed liquid crystal 300 is also considered as a state where the refractive index of the liquid crystal component 320 and that of the polymer network 310 mismatch to each other.

The scattering state is a state of scattering light. For example, the polymer-dispersed liquid crystal 300 in the scattering state may have a transmittance of 50% or lower. The lower limit of the transmittance of the polymer-dispersed liquid crystal 300 in the scattering state may be 0% to 1%, for example. Herein, the transmittance of the polymer-dispersed liquid crystal in the scattering state refers to the parallel light transmittance of the polymer-dispersed liquid crystal in the scattering state. The transmittance of the polymer-dispersed liquid crystal in the scattering state can be measured in the following manner, for example. The luminance is measured using a spectroradiometer (SR-UL1) available from Topcon Technohouse Corp. at a light acceptance angle of 2° when a liquid crystal panel including a polymer-dispersed liquid crystal with voltage applied is placed on a common backlight including a halogen lamp as a light source (i.e., light source for liquid crystal display elements) and when nothing is placed on the backlight. The measurement wavelength is about 550 nm, which is the wavelength at which the luminous reflectance Y value representing the visual sensitivity of the human eye is highest. The luminance measured when the liquid crystal panel with voltage applied is placed on the backlight is divided by the luminance measured when nothing is placed on the backlight, so that the transmittance of the polymer-dispersed liquid crystal in the scattering state can be determined.

The haze, which indicates the light scattering percentage of the polymer-dispersed liquid crystal 300 in the scattering state, varies in response to the voltage applied and may be, for example, 80% or higher or 90% or higher. The upper limit of the haze indicating the light scattering percentage of the polymer-dispersed liquid crystal 300 in the scattering state may be 90% to 100%, for example. In the present embodiment, the polymer-dispersed liquid crystal 300 in the scattering state scatters visible light. The polymer-dispersed liquid crystal 300 in the scattering state is therefore in the same condition as frosted glass. Herein, the haze is measured by a method in conformity with JIS K 7136. The haze may be measured with, for example, a haze meter "Haze Meter NDH2000" available from Nippon Denshoku Industries Co., Ltd. using a halogen lamp as a light source.

As described above, the liquid crystal display element 1 varies the difference in extraordinary refractive index ne and the difference in ordinary refractive index no each between the liquid crystal component 320 and the polymer network 310 in the polymer-dispersed liquid crystal 300 to adjust the amount of light passing through the liquid crystal panel 11. The liquid crystal display element 1 therefore requires no polarizer which is required in a common liquid crystal display element.

The photopolymerizable liquid crystal compound for forming the polymer network 310 may be, for example, one that exhibits a liquid crystal phase at room temperature to form a miscible blend with the liquid crystal component 320 and is phase-separated from the liquid crystal component 320 after it is cured by ultraviolet irradiation to form a polymer.

Examples of the photopolymerizable liquid crystal compound include monomers having a substituent such as a biphenyl group, a terphenyl group, a naphthalene group, a phenylbenzoate group, an azobenzene group, or a derivative of any of these groups (hereinafter, they are also referred to as mesogen groups); a photoreactive group such as a cinnamoyl group, a chalcone group, a cinnamylidene group, a β-(2-phenyl)acryloyl group, a cinnamic acid group, or a derivative of any of these groups; and a polymerizable group such as an acrylate, methacrylate, maleimide, N-phenylmaleimide, or siloxane group. The polymerizable group is preferably an acrylate group. The number of polymerizable groups per molecule of the photopolymerizable liquid crystal compound is preferably, but is not limited to, 1 or 2.

The liquid crystal component 320 may not have a polymerizable group such as an acrylate, methacrylate, maleimide, N-phenyl maleimide, or siloxane group.

In the present embodiment, the anisotropy of dielectric constant (Δε) of the liquid crystal component 320 defined by the following formula (L) may be positive or negative, and is preferably positive when alignment films 410 and 420 to be described later are horizontal alignment films. This mode can more effectively achieve simultaneously a high degree of scattering and low-voltage driving. Molecules of a liquid crystal component (liquid crystal molecules) having a positive anisotropy of dielectric constant are aligned in the direction parallel to the electric field direction. Molecules of a liquid crystal component (liquid crystal molecules) having a negative anisotropy of dielectric constant are aligned in the direction vertical to the electric field direction. Molecules of a liquid crystal component (liquid crystal molecules) having a positive anisotropy of dielectric constant are also referred to as positive liquid crystals. Molecules of a liquid crystal component (liquid crystal molecules) having a negative anisotropy of dielectric constant are also referred to as negative liquid crystals. The long axis direction of the liquid crystal component (liquid crystal molecules) corresponds to the slow axis direction. The long axis direction of the liquid crystal component (liquid crystal molecules) with no voltage applied is also referred to as the initial alignment direction of the liquid crystal component (liquid crystal molecules).

$$\Delta\varepsilon = \text{(dielectric constant in long axis direction of liquid crystal component (liquid crystal molecules))} - \text{(dielectric constant in short axis direction of liquid crystal component (liquid crystal molecules))} \quad (L)$$

The liquid crystal component 320 used may be, for example, a tolan-type liquid crystal material (liquid crystal material having a —C≡C— bond (carbon-carbon triple bond) as a linking group).

The liquid crystal component 320 has an anisotropy of refractive index Δn of 0.18 or higher and 0.24 or lower. Preferably, the liquid crystal component 320 has an anisotropy of dielectric constant Δε of 15 or higher and 25 or lower, and the liquid crystal component 320 has a rotational viscosity γ1 of 100 mPa·s or higher and 300 mPa·s or lower. This mode can simultaneously achieve a high degree of scattering and low-voltage driving, while achieving a response speed equal to that of a common liquid crystal display element containing no polymer network. This effect can be achieved when the anisotropy of refractive index Δn, the anisotropy of dielectric constant Δε, and the rotational viscosity γ1 of the liquid crystal component 320 all fall within the respective ranges above.

Specific examples of the tolan-type liquid crystal material include liquid crystal materials having a structure represented by the following formula (L1).

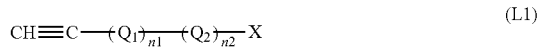
(L1)

In the formula, Q1 and Q2 each independently represent an aromatic ring group; X represents a fluorine group or a cyano group; and n1 and n2 each independently represent 0 or 1.

The symbols n1 and n2 in the formula (L1) are not 0 at the same time. In other words, the sum of n1 and n2 is 1 or 2.

The aromatic ring groups in the formula (L1) may have a substituent.

In the formula (L1), preferably, Q1 and Q2 each independently have any one of the structures represented by the following formulas (L2-1) to (L2-7).

(L2-1)

(L2-2)

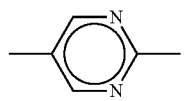
(L2-3)

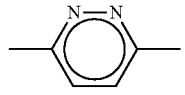
(L2-4)

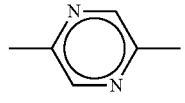
(L2-5)

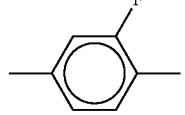
(L2-6)

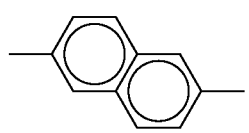
(L2-7)

Specific examples of the structure represented by the formula (L1) in the liquid crystal material include the following structures.

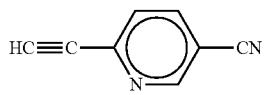

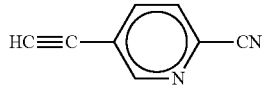

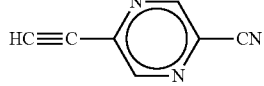

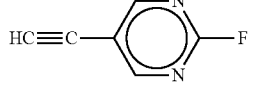

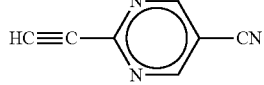

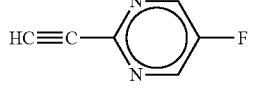

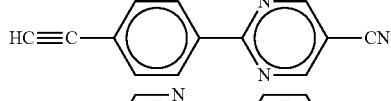

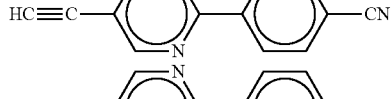

-continued

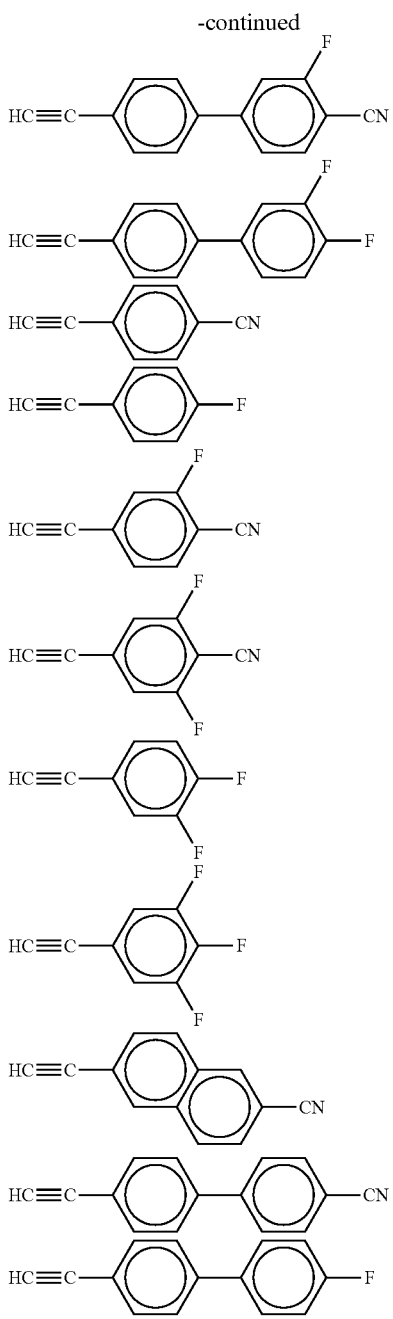

Preferably, the weight ratio of the liquid crystal component 320 to the polymer network 310, i.e., (liquid crystal component):(polymer network), is 90:10 to 97:3. In other words, preferably, the weight of the liquid crystal component 320 relative to the polymer network 310 is 90 or more and 97 or less; and when the weight of the liquid crystal component 320 is 90 or more, the weight of the polymer network 310 is 10 or less, while when the weight of the liquid crystal component 320 is 97 or less, the weight of the polymer network 310 is 3 or more. This mode can effectively achieve simultaneously a high degree of scattering and low-voltage driving. If the weight of the polymer network 310 relative to the liquid crystal component 320 is more than 10, a high degree of scattering can be achieved but the driving voltage may be high. If the weight of the polymer network 310 relative to the liquid crystal component 320 is less than 3, the driving voltage can be reduced but a high degree of scattering may not be achieved.

Preferably, the liquid crystal panel 11 includes an alignment film between the polymer-dispersed liquid crystal 300 and at least one of the pair of substrates (the first substrate 100 and the second substrate 200) sandwiching the polymer-dispersed liquid crystal 300 in between. This mode can cause the alignment film to mainly control the alignment of the liquid crystal component 320 in the polymer-dispersed liquid crystal 300 when the voltage applied to the polymer-dispersed liquid crystal 300 is lower than the threshold voltage (including no voltage application).

The following describes a mode in which the first alignment film 410 is disposed between the first substrate 100 and the polymer-dispersed liquid crystal 300 and a second alignment film 420 is disposed between the second substrate 200 and the polymer-dispersed liquid crystal 300, but the liquid crystal panel 11 is not limited thereto. For example, an alignment film may be disposed only between the first substrate 100 and the polymer-dispersed liquid crystal 300 or between the second substrate 200 and the polymer-dispersed liquid crystal 300, or an alignment film may not be disposed between the first substrate 100 and the polymer-dispersed liquid crystal 300 and between the second substrate 200 and the polymer-dispersed liquid crystal 300. For example, in the case where the liquid crystal panel 11 includes either the first alignment film 410 or the second alignment film 420 and the alignment film is a horizontal alignment film while the interface between the substrate without the alignment film and the polymer-dispersed liquid crystal 300 is slippery (having zero anchoring), the liquid crystal component 320 is in twisted horizontal alignment. This ultimately results in the same alignment state as in the case where horizontal alignment films are disposed on the respective substrates.

The first alignment film 410 and the second alignment film 420 are layers having been subjected to alignment treatment for controlling the alignment of the liquid crystal component 320 and the photopolymerizable liquid crystal compound, and each may be an alignment film commonly used in the field of liquid crystal display elements, such as a polyimide film. The first alignment film 410 and the second alignment film 420 each may be a rubbing alignment film having been subjected to rubbing treatment or a photoalignment film having been subjected to photoalignment treatment. Hereinafter, the molecules of the liquid crystal component 320 and the molecules of the photopolymerizable liquid crystal compound may also be simply referred to as liquid crystal molecules.

A rubbing alignment film is obtainable by, for example, forming a film of an alignment film material containing a rubbing alignment film polymer on a substrate, and rubbing the surface of the film containing a rubbing alignment film polymer with a roller wrapped with a piece of cloth made of rayon or cotton at a constant rotational speed and with a constant distance between the roller and the substrate (rubbing method).

The rubbing alignment film polymer may be, for example, polyimide. The rubbing alignment film may contain one rubbing alignment film polymer or two or more rubbing alignment film polymers.

The photo-alignment film is obtainable by, for example, forming a film of an alignment film material containing a photo-alignment polymer containing a photo-functional group on a substrate, and irradiating the film with polarized ultraviolet light to give anisotropy on the surface of the film containing the photo-alignment polymer (photo-alignment method).

Examples of the photo-alignment polymer include photo-alignment polymers containing at least one photo-functional group selected from the group consisting of cyclobutane, azobenzene, chalcone, cinnamate, coumarin, stilbene, phenol ester, and phenyl benzoate groups. The photo-alignment film may contain one photo-alignment polymer or two or more photo-alignment polymers. The photo-functional group contained in the photo-alignment polymer may be present in the main chain, in a side chain, or in both the main chain and a side chain of the polymer.

The photo-alignment polymer may cause any type of photo-reaction and preferred examples of the polymer include a photolysis polymer, a photo-rearranging polymer (preferably, a photo-Fries rearranging polymer), a photoisomerizable polymer, a photodimerizable polymer, and a photo-crosslinking polymer. Any of these may be used alone or two or more thereof may be used in combination. In terms of the alignment stability, particularly preferred among these are a photolysis polymer having a reaction wavelength (main sensitive wavelength) around 254 nm and a photo-rearranging polymer having a reaction wavelength (main sensitive wavelength) around 254 nm. Also preferred are a photoisomerizable polymer containing a photo-functional group in a side chain and a photodimerizable polymer containing a photo-functional group in a side chain.

The photo-alignment polymer may contain any main chain structure, and preferred examples of the main chain structure include a polyamic acid structure, a polyimide structure, a poly(meth)acrylic acid structure, a polysiloxane structure, a polyethylene structure, a polystyrene structure, and a polyvinyl structure.

The first alignment film 410 and the second alignment film 420 are each a horizontal alignment film that aligns the liquid crystal component 320 in the direction parallel to the surface of the alignment film or a vertical alignment film that aligns the liquid crystal component 320 in the direction vertical to the surface of the alignment film. Preferably, the first alignment film 410 and the second alignment film 420 are horizontal alignment films. This mode can effectively achieve simultaneously a high degree of scattering and low-voltage driving. More preferably, the first alignment film 410 and the second alignment film 420 are horizontal alignment films and the liquid crystal component 320 has a positive anisotropy of dielectric constant. This mode can more effectively achieve simultaneously a high degree of scattering and low-voltage driving.

In the case where the first alignment film 410 and the second alignment film 420 are horizontal alignment films and the voltage applied to the polymer-dispersed liquid crystal 300 is lower than the threshold voltage (including no voltage application), the first alignment film 410 and the second alignment film 420 mainly control the liquid crystal component 320 such that the long axis thereof is parallel to the first alignment film 410 and the second alignment film 420.

In other words, the liquid crystal component 320 is aligned horizontally (homogeneously) to the first substrate 100 with no voltage applied. When voltage is applied between the common electrode 220 and the pixel electrodes 120, electric fields are generated in the polymer-dispersed liquid crystal 300 and change the alignment of the liquid crystal component 320, which can control the amount of light passing through the polymer-dispersed liquid crystal 300. The liquid crystal component 320 is horizontally aligned by the control force of the first alignment film 410 and the second alignment film 420 with no voltage applied between the common electrode 220 and the pixel electrodes 120. The liquid crystal component 320 is rotated by the vertical electric fields generated in the polymer-dispersed liquid crystal 300 with voltage applied between the common electrode 220 and the pixel electrodes 120.

The phrase "the long axis of the liquid crystal component 320 is parallel to the first alignment film 410 and the second alignment film 420" means that the tilt angle (including the pre-tilt angle) of the liquid crystal component 320 is 0° to 5°, preferably 0° to 3°, more preferably 0° to 1°, relative to the first alignment film 410 and the second alignment film 420. The tilt angle of the liquid crystal component 320 means the angle at which the long axis (optical axis) of the liquid crystal component 320 inclines from the surface of the first alignment film 410 or the second alignment film 420.

In the case where the first alignment film 410 and the second alignment film 420 are vertical alignment films and the voltage applied to the polymer-dispersed liquid crystal 300 is lower than the threshold voltage (including no voltage application), the first alignment film 410 and the second alignment film 420 mainly control the liquid crystal molecules such that the long axis thereof is vertical to the first alignment film 410 and the second alignment film 420.

In other words, the liquid crystal component 320 is aligned vertically to the first substrate 100 with no voltage applied. When voltage is applied between the common electrode 220 and the pixel electrodes 120, electric fields are generated in the polymer-dispersed liquid crystal 300 and change the alignment of the liquid crystal component 320, which can control the amount of light passing through the polymer-dispersed liquid crystal 300. The liquid crystal component 320 is vertically aligned by the control force of the first alignment film 410 and the second alignment film 420 with no voltage applied between the common electrode 220 and the pixel electrodes 120. The liquid crystal component 320 is rotated by the vertical electric fields generated in the polymer-dispersed liquid crystal 300 with voltage applied between the common electrode 220 and the pixel electrodes 120.

The phrase "the long axis of the liquid crystal component 320 is vertical to the first alignment film 410 and the second alignment film 420" means that the tilt angle (including the pre-tilt angle) of the liquid crystal component 320 is 86° to 90°, preferably 87° to 89°, more preferably 87.5° to 89°, relative to the first alignment film 410 and the second alignment film 420.

Next, a method of producing the liquid crystal panel 11 of the present embodiment is described. The method of producing the liquid crystal panel 11 includes forming the first alignment film 410 and the second alignment film 420, each having been subjected to alignment treatment, respectively on one of the surfaces of the first substrate 100 and one of the surfaces of the second substrate 200; injecting a composition containing the liquid component 320, the photopolymerizable liquid crystal compound, and a polymerization initiator between the first substrate 100 and the second substrate 200 that are disposed with the first alignment film 410 and the second alignment film 420 facing each other; and forming the polymer network 310 while curing the photopolymerizable liquid crystal compound by irradiating the composition with light.

The first substrate 100 and the second substrate 200 each may be produced by a method commonly used in the field of liquid crystal display elements.

In the forming of the alignment films, an alignment film material is applied to each of the first substrate 100 and the second substrate 200 to form the first alignment film 410 and the second alignment film 420. The alignment film material may be applied by, for example, an ink-jet method or a roll coater method. The first alignment film 410 and the second alignment film 420 are then subjected to alignment treatment. Examples of the alignment treatment include rubbing treatment in which the surface of an alignment film is rubbed with a roller, for example, and photoalignment treatment in which the surface of an alignment film is irradiated with light. The photoalignment treatment enables alignment treatment without contact with the alignment film surface, and is thus advantageous over the rubbing method in that it can reduce or prevent generation of stain or dust, for example, during the alignment treatment. An alignment film having been subjected to alignment treatment by the photoalignment treatment is also referred to as a photoalignment film.

The first alignment film 410 and the second alignment film 420 may be subjected to rubbing treatment such that they provide antiparallel alignment or parallel alignment.

In the injecting, the composition containing the liquid crystal component 320, the photopolymerizable liquid crystal compound, and a polymerization initiator is injected between the first substrate 100 and the second substrate 200 that are disposed with the first alignment film 410 and the second alignment film 420 facing each other. In the injecting, the liquid crystal molecules near the first alignment film 410 are aligned in the alignment treatment direction provided by the first alignment film 410, the liquid crystal molecules near the second alignment film 420 are aligned in the alignment treatment direction provided by the second alignment film 420, and the liquid crystal molecules around the middle position between the first alignment film 410 and the second alignment film 420 are aligned such that the alignment azimuth thereof is continuously varied between the first alignment film 410 and the second alignment film 420.

The polymerization initiator used may be any conventionally known one. Examples of the polymerization initiator used include Omnirad 184® (available from IGM Resins. B.V.) represented by the following formula (IN1) and OXE03 (available from BASF SE) represented by the following formula (IN2).

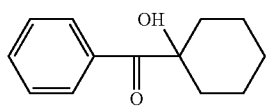
(IN1)

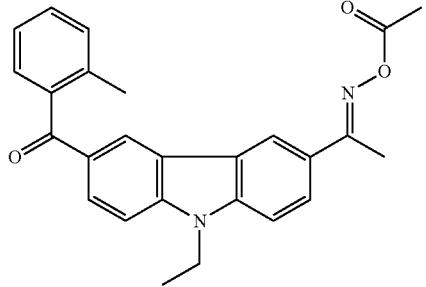
(IN2)

Preferably, the weight ratio of the liquid crystal component 320 to the photopolymerizable liquid crystal compound in the composition is 90:10 to 97:3. In other words, preferably, the weight of the liquid crystal component 320 relative to the photopolymerizable liquid crystal compound is 90 or more and 97 or less; and when the weight of the liquid crystal component 320 is 90 or more, the weight of the photopolymerizable liquid crystal compound is 10 or less, while when the weight of the liquid crystal component 320 is 97 or less, the weight of the photopolymerizable liquid crystal compound is 3 or more. This mode can effectively achieve simultaneously a high degree of scattering and low-voltage driving. If the weight of the photopolymerizable liquid crystal compound relative to the liquid crystal component 320 is more than 10, a high degree of scattering can be achieved but the driving voltage may be high. If the weight of the photopolymerizable liquid crystal compound relative to the liquid crystal component 320 is less than 3, the driving voltage can be reduced but a high degree of scattering may not be achieved.

In the irradiating with light, the composition is irradiated with light so that the polymer network 310 is formed while the photopolymerizable liquid crystal compound is cured. When the liquid crystal molecules are aligned in the injecting, the photopolymerizable liquid crystal compound exhibits a liquid crystalline phase. As the composition is irradiated with light in the irradiating with light, the photopolymerizable liquid crystal compound is cured through a photopolymerization reaction and the alignment thereof is fixed. The photopolymerizable liquid crystal compound thus forms the polymer network 310, which is incapable of responding to the electric fields. The polymer network 310 formed from the cured product of the photopolymerizable liquid crystal compound is therefore not aligned in the electric field direction even upon voltage application. In contrast, the liquid crystal component 320, the alignment of which is not fixed, is aligned in the electric field direction upon voltage application.

Thus, with no voltage applied, the alignment direction of the polymer network 310 and the alignment direction of the liquid crystal component 320 are both parallel to the first substrate 100 and the second substrate 200. In this state, matching the refractive indices of them causes the liquid crystal panel 11 to be in the transparent state. Also, with voltage applied to the polymer-dispersed liquid crystal 300 by connecting a power supply to the pixel electrodes 120 and the common electrode 220, the liquid crystal component 320 is aligned in the electric field direction. The refractive index of the liquid crystal component 320 and the refractive index of the polymer network 310 thus mismatch to each other in the interface therebetween to produce the light scattering state, causing the liquid crystal panel 11 to shift into an opaque state (scattering state).

The light used in the irradiating with light may be any light such as ultraviolet light. Examples of the ultraviolet light include light having a peak wavelength in a wavelength range of 340 nm or longer and 390 nm or shorter, for example.

In the irradiating with light, preferably, the composition is irradiated with light having an irradiance of 5 mW/cm$^2$ or higher and 50 mW/cm$^2$ or lower. An irradiance of 5 mW/cm$^2$ or higher can lead to a more sufficient degree of scattering. An irradiance of 50 mW/cm$^2$ or lower can reduce or prevent an increase in the temperature during irradiation and can reduce or prevent a decline in the yield and variation in the properties.

In the irradiating with light, preferably, the composition is irradiated with light having an irradiation dose of 0.5 J/cm$^2$ or more and 5 J/cm$^2$ or less. An irradiation dose of 0.5 J/cm$^2$ or more allows the polymerization reaction of the photopolymerizable liquid crystal compound to sufficiently proceed to reduce unreacted molecules of the photopolymerizable liquid crystal compound, forming the polymer network 310. As a result, the liquid crystal panel 11 can have improved hysteresis properties and improved anti-image-sticking properties. An irradiation dose of 5 J/cm$^2$ or less can lead to an improved production takt time.

Next, a method of displaying an image by the liquid crystal panel 11 is described. Preferably, the liquid crystal display panel 11 uses the field-sequential color (FSC) system to display an image and the light source 21 includes light-emitting elements (e.g., a red LED, a green LED, and a blue LED) that emit light rays of colors different from each other. Typically, in a liquid crystal display element that provides color display, each pixel is divided into three sub-pixels, namely a red pixel provided with a color filter that transmits red light, a green pixel provided with a color filter that transmits green light, and a blue pixel provided with a color filter that transmits blue light. The color filters in these three sub-pixels enable color display, but these color filters absorb about ⅔ of the backlight illumination applied to the liquid crystal panel. This causes an issue such that the liquid crystal display element using the color filter system has a low light use efficiency. In contrast, a liquid crystal display element that displays an image by the FSC system and that uses the light source 21 including light-emitting elements configured to emit light rays of colors different from each other enables color display without any color filters. This liquid crystal display element therefore can achieve a higher light use efficiency, a higher luminance of the liquid crystal panel 11, and a lower power consumption than the liquid crystal display element using the color filter system. Also, this mode can eliminate the need for color filters and thus allows the liquid crystal display element 1 to have a thin profile.

In the liquid crystal panel 11 using the FSC system to display an image, a single frame period, which is a display period of a single screen image, is divided into multiple fields. A field is also referred to as a sub-frame. Throughout the following description, the term "field" is used. For example, a single frame period is divided into a field that displays a red screen image based on the red color component in an input image signal (red field), a field that displays a green screen image based on the green color component in the input image signal (green field), and a field that displays a blue screen image based on the blue color component in the input image signal (blue field). The primary colors are displayed one by one as described above, whereby a color image is displayed on the liquid crystal panel.

As described above, the liquid crystal panel 11 using the FSC system to display an image can provide color display by dividing a single frame period into multiple fields such that different colors are displayed in different fields, which can eliminate the need for color filters. The liquid crystal display element 1 using the FSC system can therefore have a light use efficiency that is about triple the light use efficiency of the liquid crystal display device using the color filter system. Thus, the liquid crystal display element using the FSC system is suitable for an increase in luminance and reduction in power consumption.

Figure 5:
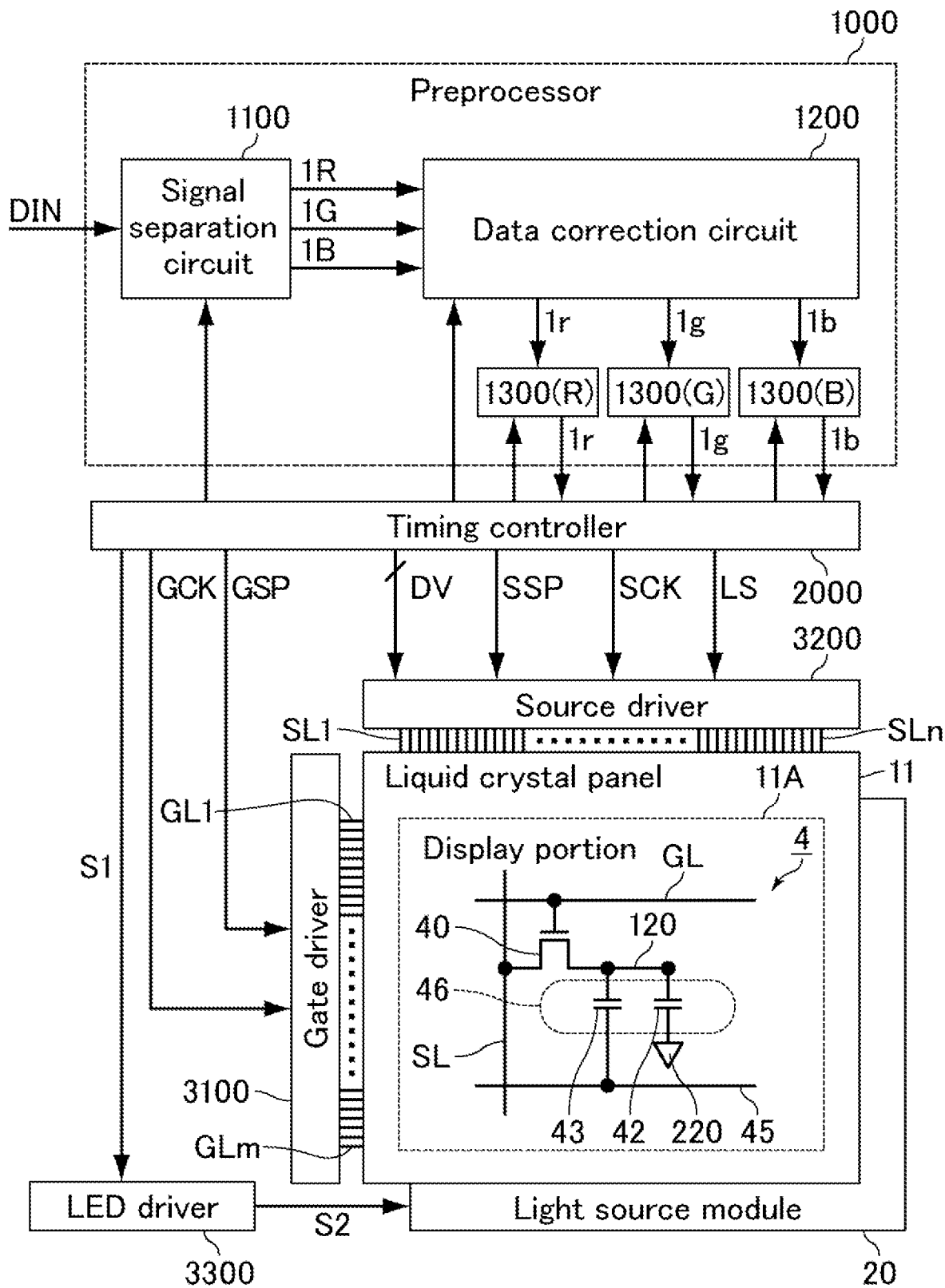
FIG. 5 is a block diagram of the overall structure of the liquid crystal display element of Embodiment 1.

FIG. 5 is a block diagram of the overall structure of the liquid crystal display element of Embodiment 1. The liquid crystal display element 1 of the present embodiment includes a preprocessor 1000, a timing controller 2000, a gate driver 3100, a source driver 3200, a LED driver 3300, the liquid crystal panel 11, and the light source module 20. One or both of the gate driver 3100 and the source driver 3200 may be disposed in the liquid crystal panel 11.

The liquid crystal panel 11 includes a display portion 11A for displaying an image. The preprocessor 1000 includes a signal separation circuit 1100, a data correction circuit 1200, a red field memory 1300(R), a green field memory 1300(G), and a blue field memory 1300(B).

In the present embodiment, the light source module 20 uses light-emitting diodes (LEDs) as the light-emitting elements. Specifically, red LEDs, green LEDs, and blue LEDs define the light source module 20. In the present embodiment, the timing controller 2000, the gate driver 3100, and the source driver 3200 define a liquid crystal panel driving unit, while the LED driver 3300 defines a light source driving unit. The signal separation circuit 1100 defines an input image data separation unit.

Figure 6:
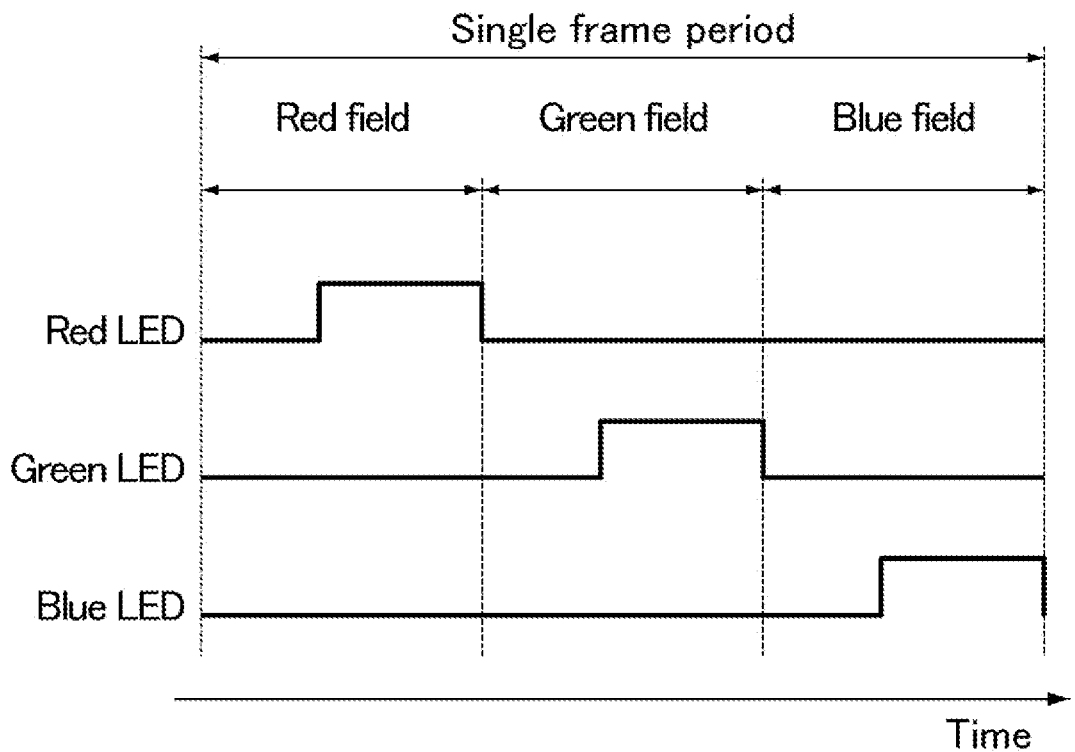
FIG. 6 is a diagram of the structure of a single frame period in the liquid crystal display element of Embodiment 1.

FIG. 6 is a diagram of the structure of a single frame period in the liquid crystal display element of Embodiment 1. A single frame period is divided into a red field during which a red screen image is displayed based on the red component in an input image signal DIN, a green field during which a green screen image is displayed based on the green component in the input image signal DIN, and a blue field during which a blue screen image is displayed based on the blue component in the input image signal DIN. In the red field, the red LEDs are turned on after an elapse of a predetermined period of time from when the field starts. In the green field, the green LEDs are turned on after an elapse of a predetermined period of time from when the field starts. In the blue field, the blue LEDs are turned on after an elapse of a predetermined period of time from when the field starts.

During operation of the liquid crystal display element 1, these red, green, and blue fields are repeated. This causes repetitive display of the red screen, the green screen, and the blue screen, displaying a desired color image on the display portion 11A. The order of the fields is not limited. The order of the fields may be, for example, the blue field, the green field, and the red field. The length of the period during which the LEDs are turned on in each field may be determined in consideration of the response performance of the liquid crystal.

As shown in FIG. 5, the display portion 11A is provided with multiple (n number of) source lines (video signal lines) SL1 to SLn and multiple (m number of) gate lines (scanning signal lines) GL1 to GLm. The intersections of the source lines SL1 to SLn and the gate lines GL1 to GLm are each provided with a pixel-forming portion 4. In other words, the display portion 11A includes multiple (n×m) pixel-forming portions 4. The pixel-forming portions 4 are arranged in a matrix pattern to define a pixel matrix with m rows × n columns. Hereinafter, each of the source lines SL1 to SLn is also simply referred to as a source line SL, and each of the gate lines GL1 to GLm is also simply referred to as a gate line GL.

Each pixel-forming portion 4 includes: a thin film transistor (TFT) 40 which is a switching element whose gate terminal is connected to the gate line GL passing the corresponding intersection and whose source terminal is connected to the source line SL passing the same intersection; a pixel electrode 120 connected to the drain terminal of the TFT 40; the common electrode 220 and an auxiliary capacitance electrode 45 common to the pixel-forming portions 4; a liquid crystal capacitance 42 formed by the pixel electrode 120 and the common electrode 220; and an auxiliary capacitance 43 formed by the pixel electrode 120 and the auxiliary capacitance electrode 45. The liquid crystal capacitance 42 and the auxiliary capacitance 43 define a pixel capacitance 46. In the display portion 11A in FIG. 5, only the components corresponding to a single pixel-forming portion 4 are shown.

The operation of the components in FIG. 5 is descried below. The signal separation circuit 1100 in the preprocessor 1000 divides an input image signal DIN from an external device into red input scale data 1R, green input scale data 1G, and blue input scale data 1B. The data correction circuit 1200 in the preprocessor 1000 corrects the input scale data (the red input scale data 1R, the green input scale data 1G, and the blue input scale data 1B) output from the signal separation circuit 1100 into data corresponding to the voltage to be applied to the liquid crystal panel 11, and outputs the corrected data as application scale data (red field application scale data 1r, green field application scale data 1g, and blue field application scale data 1b). The data correction circuit 1200 is described in more detail later.

The red field memory 1300(R), the green field memory 1300(G), and the blue field memory 1300(B) respectively store the red field application scale data 1r, the green field application scale data 1g, and the blue field application scale data 1b which are output from the data correction circuit 1200.

The timing controller 2000 reads the red field application scale data 1r, the green field application scale data 1g, and the blue field application scale data 1b respectively from the red field memory 1300(R), the green field memory 1300(G), and the blue field memory 1300(B). The timing controller 2000 then outputs a digital video signal DV; a gate start pulse signal GSP and a gate clock signal GCK which are for controlling the operation of the gate driver 3100; a source start pulse signal SSP, a source clock signal SCK, and a latch strobe signal LS which are for controlling the operation of the source driver 3200; and an LED driver control signal S1 for controlling the operation of the LED driver 3300.

The gate driver 3100 repeats supply of an active scanning signal to each gate line GL based on the gate start pulse signal GSP and the gate clock signal GCK from the timing controller 2000, with a single vertical scanning period taken as a single cycle.

The source driver 3200 receives the digital video signal DV, the source start pulse signal SSP, the source clock signal SCK, and the latch strobe signal LS from the timing controller 2000, and supplies a driving video signal to each source line SL. At this time, the source driver 3200 sequentially holds the digital video signals DV, which indicate the magnitudes of voltage to be applied to the respective source lines SL, in response to generation of pulses of the source clock signals SCK. Then, in response to generation of pulses of the latch strobe signals LS, the digital video signals DV held as above are converted into the magnitudes of analogue voltage. The converted magnitudes of analogue voltage are simultaneously applied to the source lines SL1 to SLn as driving video signals.

The LED driver 3300, based on the LED driver control signals S1 from the timing controller 2000, outputs light source control signals S2 for controlling the states of the LEDs (red LEDs, green LEDs, and blue LEDs) defining the light source module 20. The light source module 20 appropriately switches the states (switches between turning on and off) of the LEDs based on the respective light source control signals S2. In the present embodiment, the state of each LED is switched as shown in FIG. 6.

As described above, scanning signals are supplied to the gate lines GL1 to GLm and driving video signals are supplied to the source lines SL1 to SLn, so that the state of each LED is appropriately switched. Thus, an image corresponding to the input image signal DIN is displayed on the display portion 11A of the liquid crystal panel 11.

The light source module 20 includes the light source 21 and the mirror 22. The light source module 20 is preferably adjacent to the liquid crystal panel 11. This mode can effectively reduce or prevent a decrease in luminance in the scattering state.

The light source module 20 is preferably at a position apart from the liquid crystal panel 11 in a plan view. This mode can effectively reduce or prevent a decrease in luminance in the scattering state. The position apart from the liquid crystal panel 11 may be, for example, a position apart from the liquid crystal panel 11 by 1 mm or greater.

The light source module 20 preferably faces a first end portion 11X of paired opposite end portions 11X and 11Y of the liquid crystal panel 11. A liquid crystal panel that is in the transparent state with no voltage applied and is in the scattering state with voltage applied is also referred to as a reverse mode liquid crystal panel. When unpolarized light is vertically incident on a common reverse mode liquid crystal panel, the transmittance in the scattering state is as high as about 50% because only one of the polarized light components contributes to scattering, which means that scattering of light is insufficient. This is presumably because, when light from a light source is vertically incident on a main surface of a reverse mode liquid crystal panel, mismatch between the refractive index of the liquid crystal component and the refractive index of the polymer network is associated only with one of the polarized light components.

In the present embodiment, as shown in FIG. 1 and FIG. 2, the light source module 20 faces the first end portion 11X of the paired opposite end portions 11X and 11Y of the liquid crystal panel 11. Thus, presumably, light is obliquely incident on the back-surface-side main surface 11P of the liquid crystal panel 11, so that mismatch between the refractive index of the liquid crystal component and the refractive index of the polymer network is associated with both polarized light components, causing a higher degree of scattering. The present embodiment enables a higher degree of scattering than, for example, a reverse mode liquid crystal panel with a polymer-dispersed liquid crystal containing a chiral agent.

The light source 21 is adjacent to the liquid crystal panel 11. The light source 21 is preferably a Lambertian light source. For the light source module including a Lambertian light source with the same luminous flux, the smaller the area of the light-emitting surface, the higher the luminance of the light-emitting surface and the higher the luminance of the point of incidence of the emitted light. The light source 21 may be a LED light source, for example. The LED light source is a Lambertian light source. The light source 21 preferably includes light-emitting elements (e.g., a red LED, a green LED, and a blue LED) that emit light rays of colors different from each other. The light source 21 preferably has a rod shape in which the light-emitting elements are linearly arranged, and more preferably has a rod shape along an end portion of the liquid crystal panel 11.

In a plan view, the light source module 21 is preferably at a position apart from the liquid crystal panel 11. This mode can effectively reduce or prevent a decrease in luminance in the scattering state. For example, as shown in FIG. 1, when the display surface of the rectangular liquid crystal panel 11 is observed in the x-axis direction (direction from the viewing surface side to the back surface side), the light source 21 is at a position apart from the liquid crystal panel 11 in the z-axis direction (the short side direction of the liquid crystal panel 11).

The mirror 22 has a function of reflecting light emitted from the light source 21 toward the liquid crystal panel 11. The mirror 22 may be any one that reflects light from the light source 21 toward the liquid crystal panel 11, and is preferably one formed from a material whose reflectance is higher than its absorbance against light from the light source 21. The reflecting surface of the mirror 22 preferably contains, for example, Al or Ag. This mode can achieve an increased reflectance of the mirror 22.

The reflecting surface of the mirror 22 preferably has a reflectance of 80% or higher. The reflectance of the reflecting surface of the mirror 22 is preferably as high as possible and the upper limit is not limited. The reflectance of the reflecting surface of the mirror 22 may be 99% or lower, for example. The reflectance of the reflecting surface of the mirror 22 is preferably 80% or higher and 99% or lower, more preferably 95% or higher and 99% or lower.

The mirror 22 is preferably on the opposite side of the light source 21 from the liquid crystal panel 11. The mirror 22 is preferably provided along the light source 21.

The mirror 22 is preferably adjacent to the liquid crystal panel 11. This mode can effectively reduce or prevent a decrease in luminance in the scattering state.

In a plan view, the mirror 22 is preferably at a position apart from the liquid crystal panel 11. This mode can effectively reduce or prevent a decrease in luminance in the scattering state.

The mirror 22 is preferably a continuous freeform surface mirror. This mode can effectively reduce or prevent a decrease in luminance in the scattering state. The freeform surface herein refers to a surface that is not expressed by a single formula throughout the surface or a surface that is expressed by a Fourier series. The freeform surface may be, for example, a surface expressed by providing a plurality of intersections and a plurality of curvatures in the space and interpolating adjacent intersections by an equation of higher degree. The freeform surface is different from a simple surface expressed by a simple formula, such as a spherical surface or a cylindrical surface. The mirror 22 is more preferably a continuous freeform surface mirror in the x-axis direction.

Figure 7:
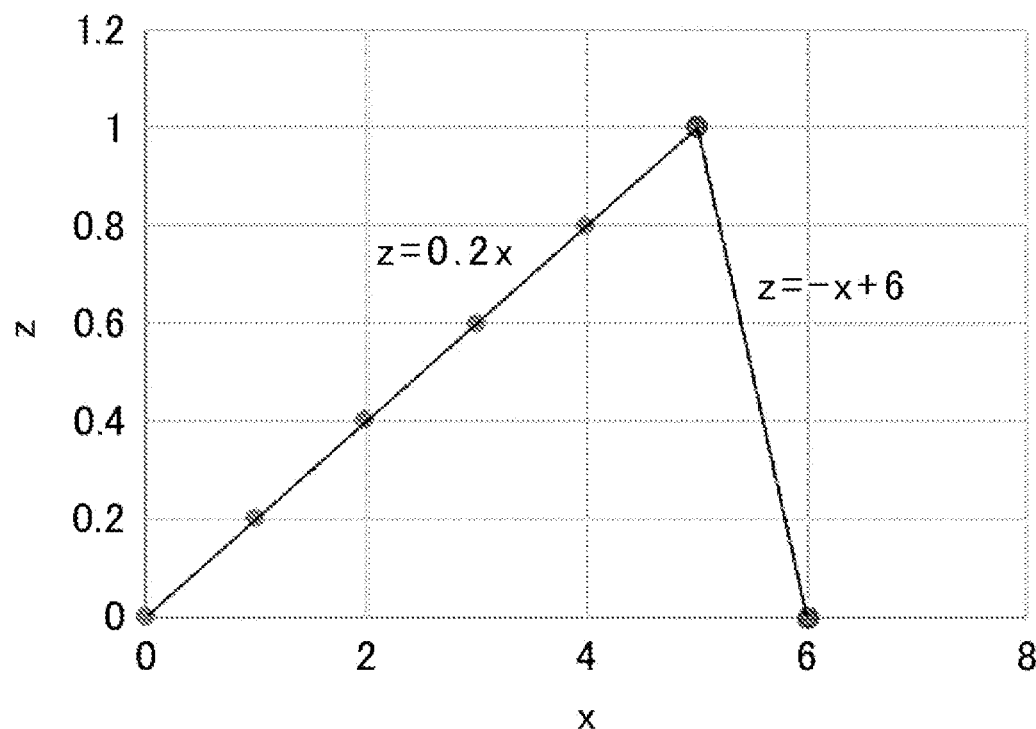
FIG. 7 is a diagram of an example of the arrangement coordinates of a mirror in the liquid crystal display element of Embodiment 1 where the mirror has a shape expressed by two or more independent functions.

Alternatively, the mirror 22 preferably has a shape expressed by two or more independent functions. This mode can effectively reduce or prevent a decrease in luminance in the scattering state. FIG. 7 is a diagram of an example of the arrangement coordinates of the mirror in the liquid crystal display element of Embodiment 1 where the mirror has a shape expressed by two or more independent functions. As shown in FIG. 7, the mirror 22 more preferably has a shape expressed by two or more independent functions in the x-axis direction. The independent functions refer to functions requiring divided cases for the x value. The shape expressed by two or more independent functions may be, for example, a shape represented by two functions, i.e., $z=0.2x$ when $0 \leq x \leq 5$ and $z=x+6$ when $5 \leq x \leq 6$ as shown in FIG. 7. They have the same value at $x=5$ and form a continuous shape, but the shape requires two functions so as to be expressed by formulas.

Still alternatively, the mirror 22 preferably has a shape expressed by three or more independent functions. This mode can effectively reduce or prevent a decrease in luminance in the scattering state. The mirror 22 more preferably has a shape expressed by three or more independent functions in the x-axis direction.

Preferably, as shown in FIG. 1, the mirror 22 includes a collimator 221 configured to collimate a Lambertian light source 21 (particularly, light emitted from the Lambertian light source 21), a first light distributor 222, and a second light distributor 223; and provided that the thickness direction, the in-plane horizontal direction, and the in-plane vertical direction of the liquid crystal panel 11 respectively correspond to the x-axis direction, the y-axis direction, and the z-axis direction, the collimator 221 is away from the liquid crystal panel 11 in the z-axis direction; the first light distributor 222 is more away from the liquid crystal panel 11 than the collimator 221 in the x-axis direction; and the second light distributor 223 is more away from the liquid crystal panel 11 than the first light distributor 222 in the x-axis direction. This mode can effectively reduce or prevent a decrease in luminance in the scattering state.

The collimator 221 has a function of collimating the Lambertian light source 21. Specifically, it has a function of converting scattered light into parallel light. The first light distributor 222 and the second light distributor 223 each have a function of scattering light.

More preferably, 30% or more and 60% or less of the total luminous flux collimated is applied to the first light distributor 222, and 40% or more and 100% or less of the luminous flux collimated and applied to the first light distributor 222 is applied to the liquid crystal panel 11, and 40% or more and 70% or less of the total luminous flux collimated, which corresponds to the luminous flux collimated and not applied to the first light distributor 222, is applied to the second light distributor 223, and 40% or more and 100% or less of the luminous flux collimated and applied to the second light distributor 223 is applied to the liquid crystal panel 11. This mode can more effectively reduce or prevent a decrease in luminance in the scattering state.

The collimator 221, the first light distributor 222, and the second light distributor 223 preferably have the same length in the y-axis direction.

Also preferably, the mirror 22 includes the collimator 221 configured to collimate the Lambertian light source 21, the first light distributor 222, and the second light distributor 223; and provided that the thickness direction, the in-plane horizontal direction, and the in-plane vertical direction of the liquid crystal panel 11 respectively correspond to the x-axis direction, the y-axis direction, and the z-axis direction, the collimator 221 is away from the liquid crystal panel 11 in the z-axis direction; the second light distributor 223 is more away from the liquid crystal panel 11 than the collimator 221 in the x-axis direction; and the first light distributor 222 is more away from the liquid crystal panel 11 than the second light distributor 223 in the x-axis direction. This mode can effectively reduce or prevent a decrease in luminance in the scattering state.

More preferably, 30% or more and 60% or less of the total luminous flux collimated is applied to the second light distributor 223, and 40% or more and 100% or less of the luminous flux collimated and applied to the second light distributor 223 is applied to the liquid crystal panel 11, and 40% or more and 70% or less of the total luminous flux collimated, which corresponds to the luminous flux collimated and not applied to the second light distributor 223, is applied to the first light distributor 222, and 40% or more and 100% or less of the luminous flux collimated and applied to the first light distributor 222 is applied to the liquid crystal panel 11. This mode can more effectively reduce or prevent a decrease in luminance in the scattering state.

Preferably, the amount of light applied from the first light distributor 222 to the liquid crystal panel 11 reaches the maximum within a range of 60% from the first end portion 11X of the liquid crystal panel 11 adjacent to the light source module 20, while the amount of light applied from the second light distributor 223 to the liquid crystal panel 11 reaches the maximum within a range of 50% from the second end portion 11Y of the liquid crystal panel 11 opposite to the first end portion 11X adjacent to the light source module 20. This mode can more effectively reduce or prevent a decrease in luminance in the scattering state. The phrase "the amount of light reaches the maximum within a range of a predetermined percentage from an end portion" means that the amount of light reaches the maximum within a range of a predetermined percentage of the whole area of the liquid crystal panel from a first end portion toward a second end portion facing the first end portion.

Preferably, the mirror 22 includes the collimator 221 configured to collimate the Lambertian light source 21, the first light distributor 222, and the second light distributor 223; and provided that the thickness direction, the in-plane horizontal direction, and the in-plane vertical direction of the liquid crystal panel respectively correspond to the x-axis direction, the y-axis direction, and the z-axis direction, that the liquid crystal panel 11 has a length A (mm) in the z-axis direction, that the point of the light source module 20 having the smallest distance relative to the liquid crystal panel 11 has module-relative coordinates (x, z)=(0, 0), and that the module-relative coordinates are expressed by a unit of mm, the light source 21, the collimator 221, the first light distributor 222, and the second light distributor 223 respectively have module-relative coordinates $(x_1, z_1)$, $(x_2, z_2)$, $(x_3, z_3)$, and $(x_4, z_4)$ satisfying the following Formula 1 to Formula 15. This mode can effectively reduce or prevent a decrease in luminance in the scattering state.

$(x_1, z_1) = (x_e, 0)$ (Formula 1)

$z_2 = (4 \times x_e \times x_2)^{0.5}$ (Formula 2)

$z_3 = -(4 \times a \times x_3)^{0.5} + (b \times x_3) + \alpha$ (Formula 3)

$z_4 = -(4 \times c \times x_4)^{0.5} + (d \times x_4) + \beta$ (Formula 4)

$1 \times (A/300) \leq x_e \leq 30 \times (A/300)$ (Formula 5)

$0 \leq x_1 \leq 60 \times (A/300)$ (Formula 6)

$30 \times (A/300) \leq x_2 \leq 80 \times (A/300)$ (Formula 7)

$45 \times (A/300) \leq x_3 \leq 90 \times (A/300)$ (Formula 8)

$55 \times (A/300) \leq x_4 \leq 90 \times (A/300)$ (Formula 9)

$0 \leq a \leq 50$ (Formula 10)

$-10 \leq b \leq 10$ (Formula 11)

$0 \leq c \leq 50$ (Formula 12)

$-10 \leq d \leq 10$ (Formula 13)

$0 \times (A/300) \leq \alpha \leq 100 \times (A/300)$ (Formula 14)

$0 \times (A/300) \leq \beta \leq 100 \times (A/300)$ (Formula 15)

Preferably, the mirror 22 further includes a third light distributor and the third light distributor has module-relative coordinates $(x_5, z_5)$ satisfying the following Formula 16 to Formula 19. This mode can more effectively reduce or prevent a decrease in luminance in the scattering state.

$z_5 = -(4 \times e \times x_5)^{0.5} + (f \times x_5) + \gamma$ (Formula 16)

$0 \leq e \leq 50$ (Formula 17)

$-10 \leq f \leq 10$ (Formula 18)

$0 \times (A/300) \leq \gamma \leq 100 \times (A/300)$ (Formula 19)

The third light distributor has a function of scattering light similarly to the first light distributor 222 and the second light distributor 223. The collimator 221, the first light distributor 222, the second light distributor 223, and the third light distributor preferably have the same length in the y-axis direction.

Figure 8:
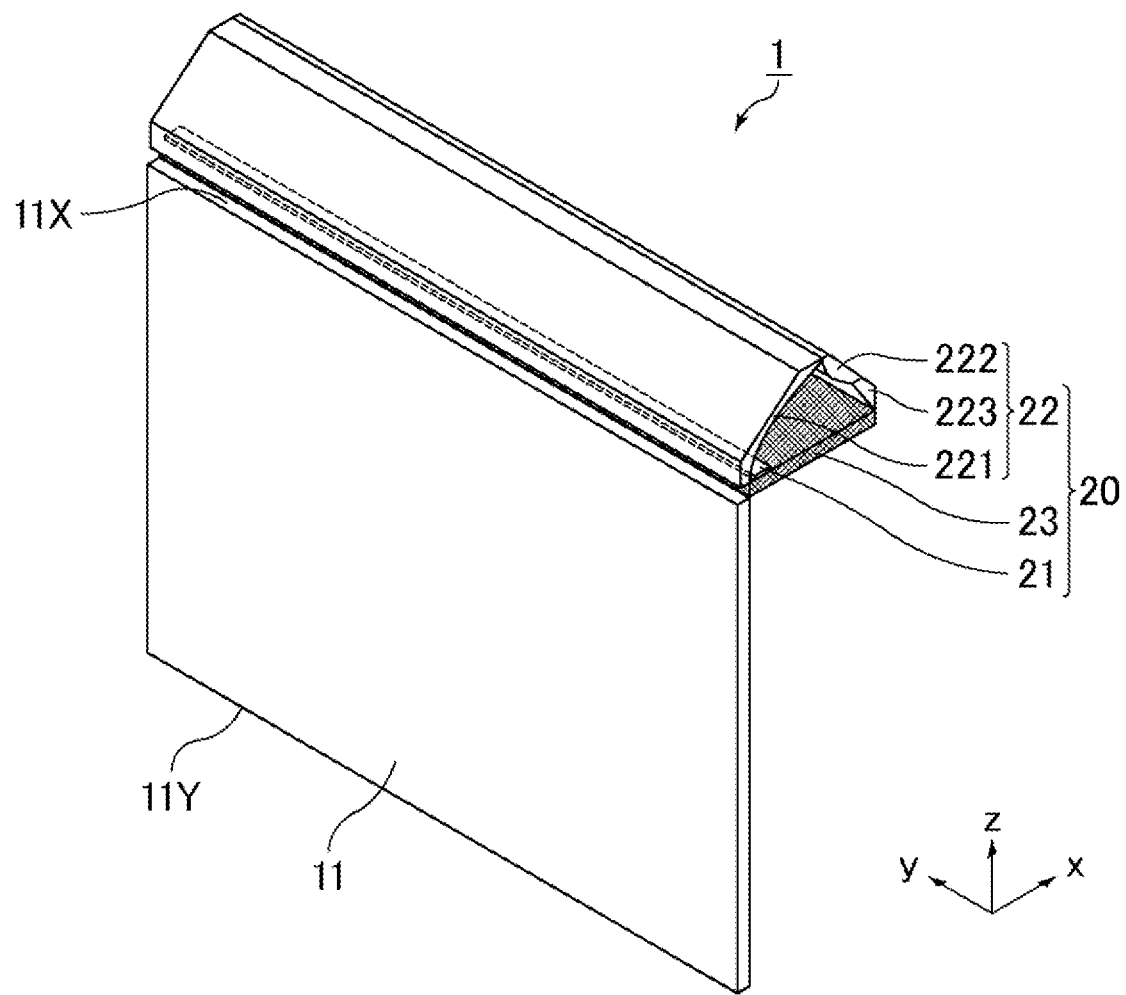
FIG. 8 is a schematic perspective view of an example of a light source module in the liquid crystal display element of Embodiment 1.

FIG. 8 is a schematic perspective view of an example of the light source module in the liquid crystal display element of Embodiment 1. As shown in FIG. 8, provided that the thickness direction, the in-plane horizontal direction, and the in-plane vertical direction of the liquid crystal panel 11 respectively correspond to the x-axis direction, the y-axis direction, and the z-axis direction, and that the point of the light source module 20 having the smallest distance relative to the liquid crystal panel 11 (the point having the smallest distance from the liquid crystal panel 11 among the group of points defining the light source module 20) has module-relative coordinates (x, z)=(0, 0), the light source module 20 also preferably includes a diffuser 23 having a haze of 1% or higher and 40% or lower in the plane satisfying z=0. This mode can effectively reduce or prevent a decrease in luminance in the scattering state.

For example, the diffuser 23 may have a structure in which particles are dispersed in a resin-containing base material and has a function of diffusing light passing therethrough. Light emitted from the light source 21 is incident on the back surface (plane of incidence) of the diffuser 23 and emits from the front surface (plane of emission) of the diffuser 23 in a diffusing manner toward the liquid crystal panel 11. The diffuser 23 may be either a plate or a sheet.

The diffuser 23 is preferably provided on the back surface side of the liquid crystal panel 11. This mode can more effectively reduce or prevent a decrease in luminance in the scattering state. The back surface side of the liquid crystal panel 11 refers to the range where x≥0.

The liquid crystal display element 1 of the present embodiment has a structure including, in addition to the components described above, components including external circuits such as a tape-carrier package (TCP) and a printed circuit board (PCB); optical films such as a viewing angle-increasing film and a luminance-increasing film; and a bezel (frame). Some components may be incorporated into another component. Components other than those described above are not limited and are not described here because such components may be those commonly used in the field of liquid crystal display elements.

Embodiment 2

The features unique to the present embodiment are mainly described here, and description of the matters already described in Embodiment 1 is omitted. The present embodiment is substantially the same as Embodiment 1 except that a light source module including a light source and a mirror is provided not only adjacent to the first end portion of the paired opposite end portions of the liquid crystal panel but also adjacent to the second end portion.

Figure 9:
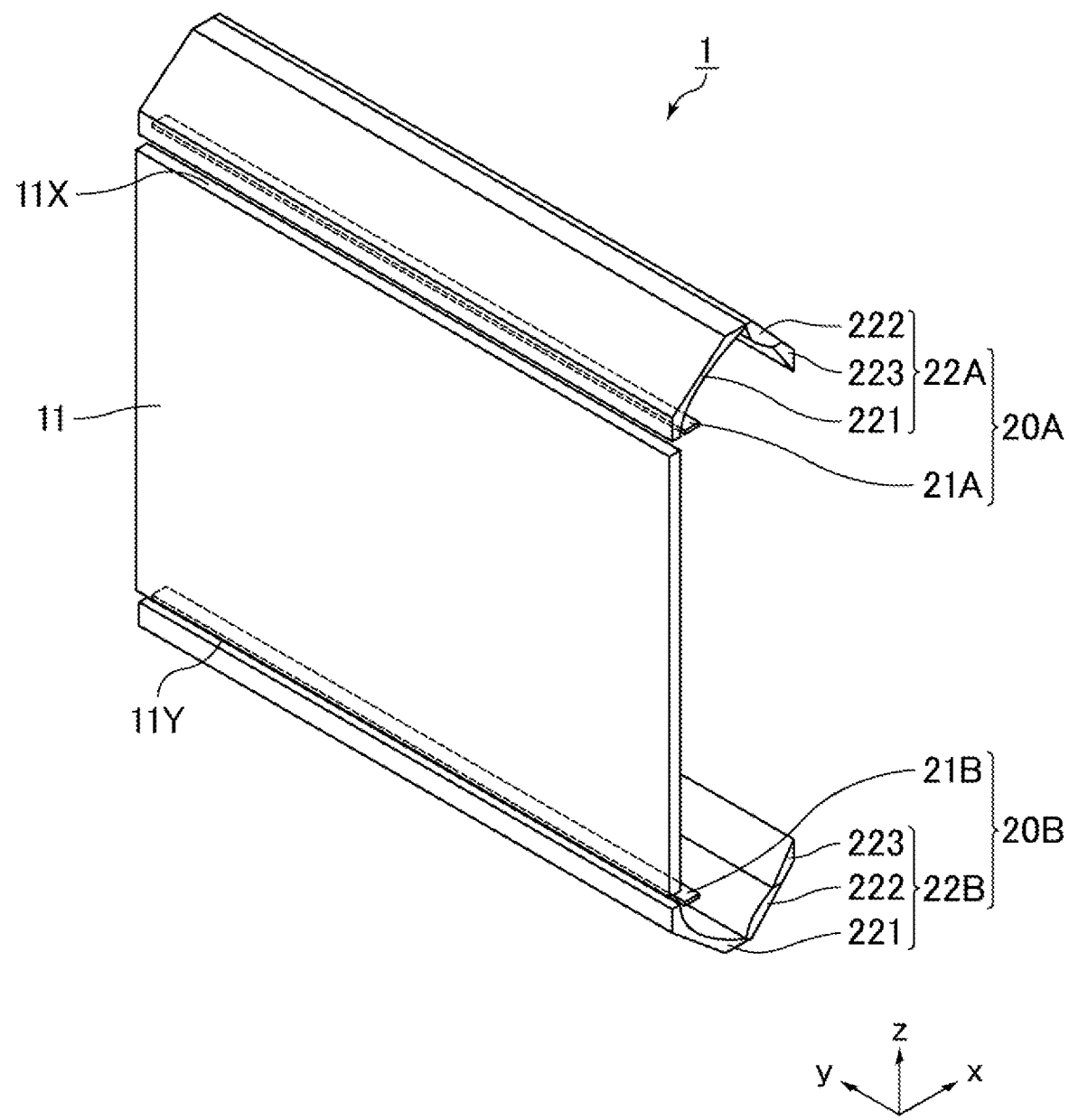
FIG. 9 is a schematic perspective view of a liquid crystal display element of Embodiment 2.

FIG. 9 is a schematic perspective view of a liquid crystal display element of Embodiment 2. As shown in FIG. 9, the liquid crystal display element 1 of the present embodiment includes a first light source 21A, a first mirror 22A, and a first light source module 20A respectively as the light source 21, the mirror 22, and the light source module 20 in Embodiment 1. The liquid crystal display element 1 further includes a second light source module 20B including a second light source 21B adjacent to the liquid crystal panel 11 and facing the second end portion 11Y of the paired end portions 11X and 11Y and a second mirror 22B configured to reflect light emitted from the second light source 21B toward the liquid crystal panel 11. This mode enables application of light from both sides of the paired end portions 11X and 11Y toward the liquid crystal panel 11, resulting in a more uniform in-plane luminance of the liquid crystal panel 11.

The first light source module 20A is the same as the light source module 20 in Embodiment 1. The second light source module 20B is the same as the first light source module 20A except that it is adjacent to the second end portion 11Y. The first light source module 20A and the second light source module 20B may have the same shape or may have different shapes.

Embodiment 3

The features unique to the present embodiment are mainly described here, and description of the matters already described in Embodiment 1 is omitted. The present embodiment is substantially the same as Embodiment 1 except that a light source module including a light source and a mirror is provided adjacent to a first end portion of paired opposite end portions of the liquid crystal panel and a light source module including a mirror and not including a light source is provided adjacent to a second end portion.

Figure 10:
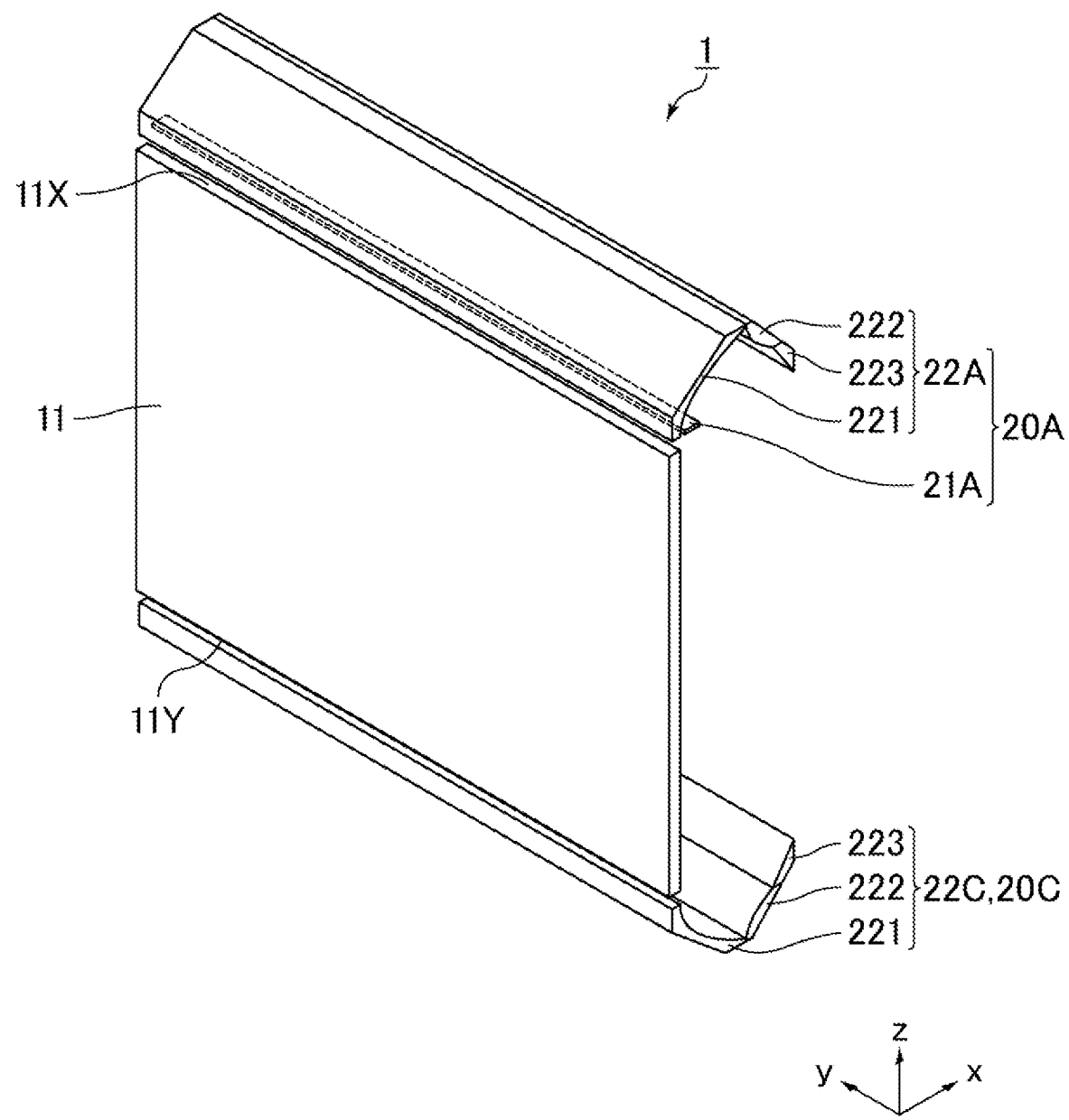
FIG. 10 is a schematic perspective view of a liquid crystal display element of Embodiment 3.

FIG. 10 is a schematic perspective view of a liquid crystal display element of Embodiment 3. As shown in FIG. 10, the liquid crystal display element 1 of the present embodiment includes the first light source 21A, the first mirror 22A, and the first light source module 20A respectively as the light source 21, the mirror 22, and the light source module 20 in Embodiment 1. The liquid crystal display element 1 further includes a third light source module 20C including a third mirror 22C adjacent to the liquid crystal panel 11, facing a second end portion 11Y of the paired end portions 11X and 11Y, and configured to reflect light incident thereon toward the liquid crystal panel 11, and including no light source. This mode enables reflecting light emitted from the first light source module 20A on the third mirror 22C of the third light source module 20C including no light source to the liquid crystal panel 11 again, resulting in a more uniform in-plane luminance of the liquid crystal panel 11.

The first light source module 20A is the same as the light source module 20 in Embodiment 1. The third light source module 20C is the same as the first light source module 20A except that it is adjacent to the second end portion 11Y and it includes no light source. The first light source module 20A and the third light source module 20C may have the same shape or may have different shapes.

Hereinafter, the present invention is described in more detail based on an example and a comparative example. The present invention is not limited to these examples.
(Liquid Crystal Display Element of Comparative Example 1)

Figure 11:
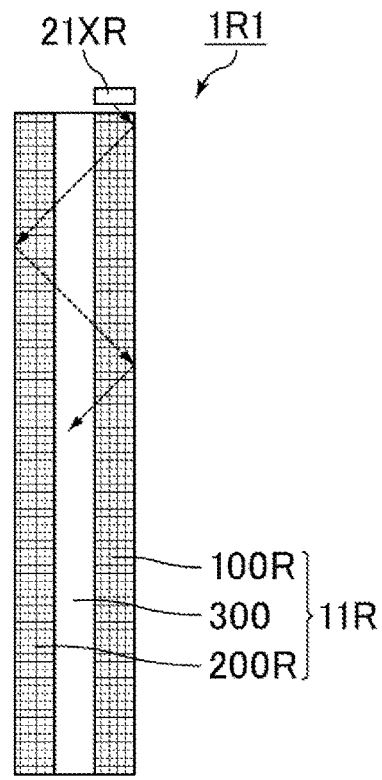
FIG. 11 is a schematic cross-sectional view of a liquid crystal display element of Comparative Example 1.

FIG. 11 is a schematic cross-sectional view of a liquid crystal display element of Comparative Example 1. The liquid crystal display element of Comparative Example 1 shown in FIG. 11 was produced. As shown in FIG. 11, a liquid crystal display element 1R1 of Comparative Example 1 includes a liquid crystal panel 11R that sequentially includes a TFT substrate 100R including a light guide plate, a polymer-dispersed liquid crystal 300, and an ITO substrate 200R, and a rod-shaped LED light source 21XR along an edge portion of the TFT substrate 100R. In other words, in the liquid crystal display element 1R1 of Comparative Example 1, a LED bar (rod-shaped LED light source 21XR) is provided adjacent to a side surface of the TFT substrate 100R. Light emitted from the LED bar to the side surface of the light guide plate is reflected in the liquid crystal panel multiple times and scattered only at portions where voltage is applied to the polymer-dispersed liquid crystal 300. The light is then emitted through the front surface of the panel to reach the eyes of a viewer in front of the panel.
(Liquid Crystal Display Element of Example 1)

Figure 12:
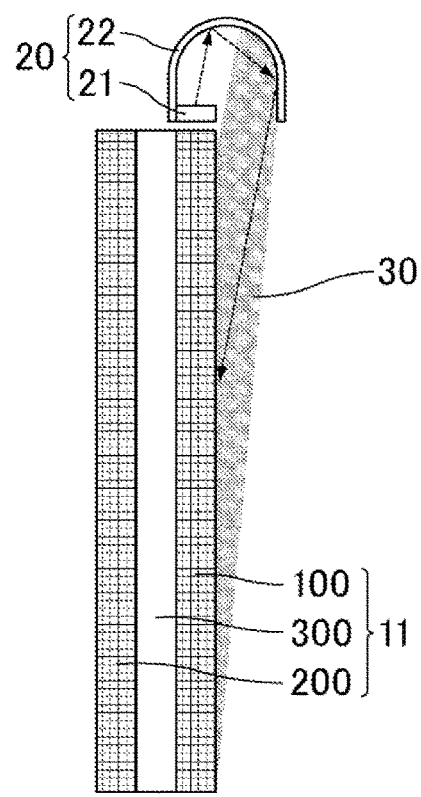
FIG. 12 is a schematic cross-sectional view of a liquid crystal display element of Example 1.

FIG. 12 is a schematic cross-sectional view of a liquid crystal display element of Example 1. A liquid crystal display element corresponding to Embodiment 1 was produced. Specifically, as shown in FIG. 12, the liquid crystal display element 1 of Example 1 includes the liquid crystal panel 11 including a TFT substrate as the first substrate 100, the polymer-dispersed liquid crystal 300, and an ITO substrate as the second substrate 200, and the light source module 20 at a position apart from the liquid crystal panel 11 with an air layer 30 in between. The light source module 20 includes the light source 21 and the mirror 22. The light source 21 is an LED light source. The mirror 22 satisfies the structures (5), (7), (8), (10), and (11). The mirror 22 of Example 1 showed the following values in Formula 1 to Formula 16: $x_e=10$, $a=10$, $b=0$, $c=30$, $d=0$, $\alpha=55.6347$, and $\beta=39.8217$.

Specifically, the liquid crystal panel 11 was produced as follows. The first substrate 100 including the pixel electrodes 120 formed from ITO and the second substrate 200 including a common electrode 220 formed from ITO were prepared. The surfaces of the pixel electrodes 120 remote from the first support substrate 110 and the surface of the common electrode 220 remote from the second support substrate 210 were each coated with an alignment film material containing a photoisomerizable polymer, and then subjected to photoalignment treatment so that a first alignment film 410 and a second alignment film 420 were formed. The photoalignment treatment for the first alignment film 410 and the second alignment film 420 was performed such that they provided antiparallel alignment.

The first substrate 100 and the second substrate 200 were then placed such that the first alignment film 410 and the second alignment film 420 faced each other. Between the first substrate 100 and the second substrate 200 was injected a composition (polymer-dispersed liquid crystal material) containing 90.6 wt % of a host liquid crystal (liquid crystal component 320), which is a positive liquid crystal; 9.0 wt % of a photopolymerizable liquid crystal compound (monomer); and 8.3 wt % of a polymerization initiator. The liquid crystal component 320 used was a liquid crystal compound having $\Delta n=0.213$, $\Delta\varepsilon=+19.1$, and a rotational viscosity $\gamma 1=344$ mPa·s. The photopolymerizable liquid crystal compound used was a monomer containing a mesogen group, a photoreactive group, and an acrylate group. The polymerization initiator used was OM.651.

The polymer-dispersed liquid crystal material was irradiated with ultraviolet (UV) light with an irradiance of 70 mW/cm$^2$, an irradiation dose of 5 J/cm$^2$, and a dominant wavelength of 365 nm (i.e., 40-second irradiation) to polymerize the monomer, so that the polymer-dispersed liquid crystal 300 was formed between the first substrate 100 and the second substrate 200. Thus, the liquid crystal panel 11 having a cell thickness of 3 μm was produced. The liquid crystal panel 11 included neither a black matrix layer nor a color filter layer.

The liquid crystal panel 11 thereby produced was a reverse mode liquid crystal panel that operates in the transparent state with no voltage applied and shifts into the scattering state with voltage applied.

Figure 13:
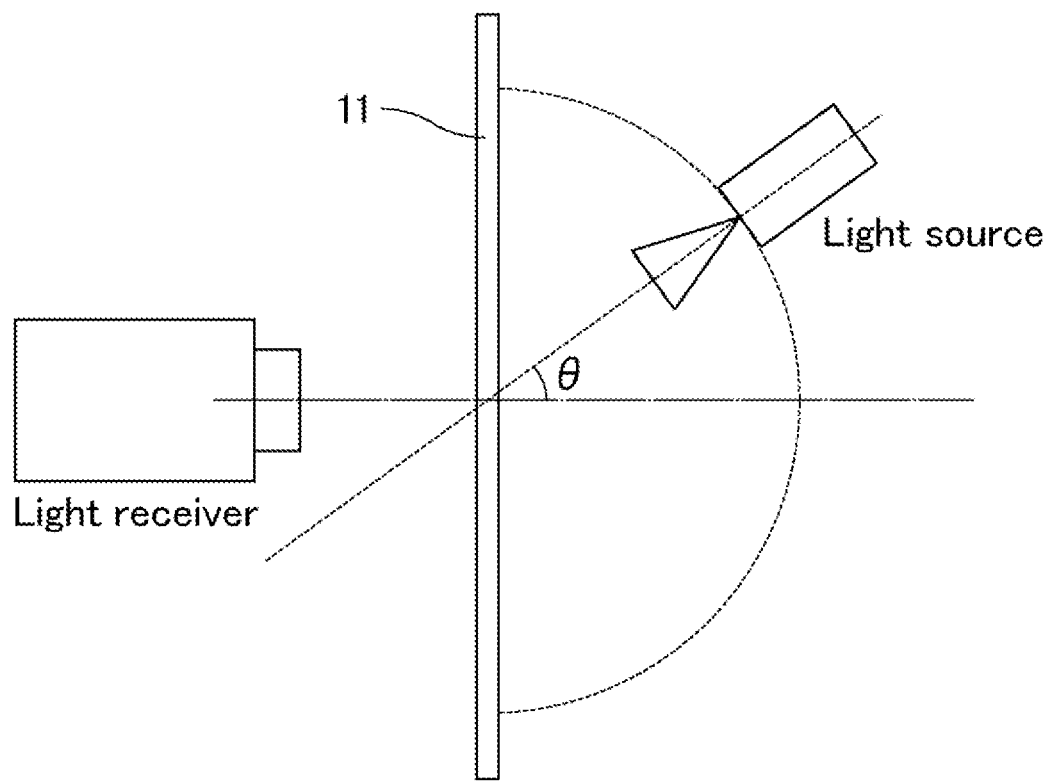
FIG. 13 is a schematic view of a method for measuring the front scattering of the liquid crystal panel in the liquid crystal display element of Example 1.
Figure 14:
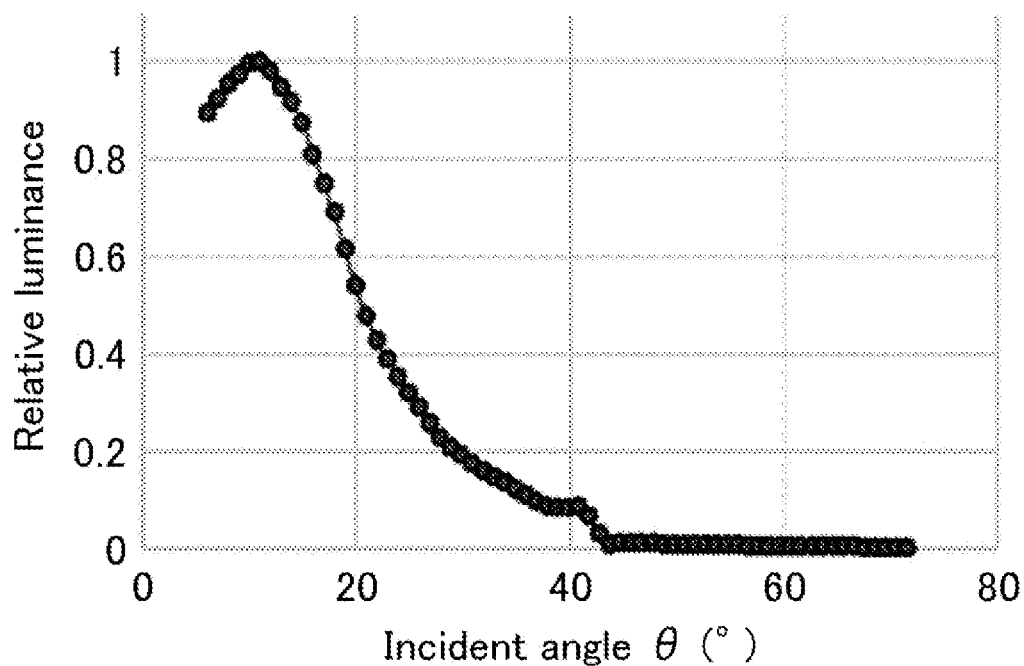
FIG. 14 is a graph of the results of measuring the front scattering of the liquid crystal panel in the liquid crystal display element of Example 1.

FIG. 13 is a schematic view of a method for measuring the front scattering of the liquid crystal panel in the liquid crystal display element of Example 1. FIG. 14 is a graph of the results of measuring the front scattering of the liquid crystal panel in the liquid crystal display element of Example 1. As shown in FIG. 13, the incident angle θ from the light source was set relative to the liquid crystal panel 11 of Example 1 and the front scattering was measured, whereby the scattering characteristics as shown in FIG. 14 were obtained.

Specifically, the light source module 20 was produced as follows. Here, the thickness direction, the in-plane horizontal direction, and the in-plane vertical direction of the liquid crystal panel 11 were respectively correspond to the x-axis direction, the y-axis direction, and the z-axis direction.

Figure 15:
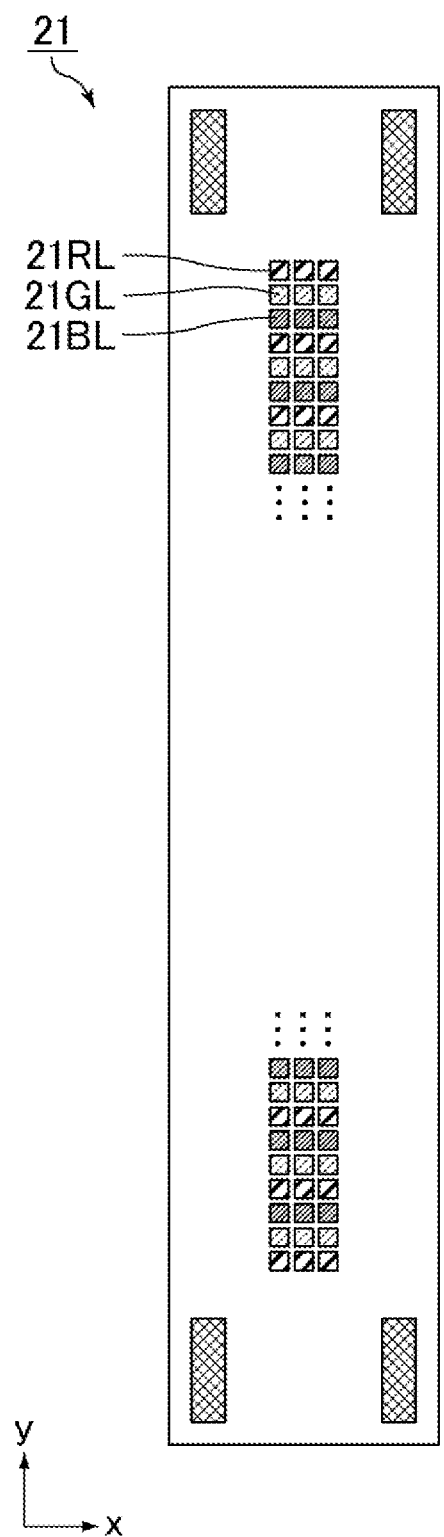
FIG. 15 is a schematic plan view of a light source of a light source module in the liquid crystal display element of Example 1.

FIG. 15 is a schematic plan view of the light source of the light source module in the liquid crystal display element of Example 1. The light source 21 of the light source module 20 in Example 1 shown in FIG. 15 is a rod-shaped light source including 144 red LED chips 21RL, 144 green LED chips 21GL, and 144 blue LED chips 21BL within a central portion, i.e., a region of 0.8 cm×36 cm, on the LED bar having a size of 3 cm×42 cm. The light source 21 was driven by FSC so that it enables full-color display.

Figure 16:
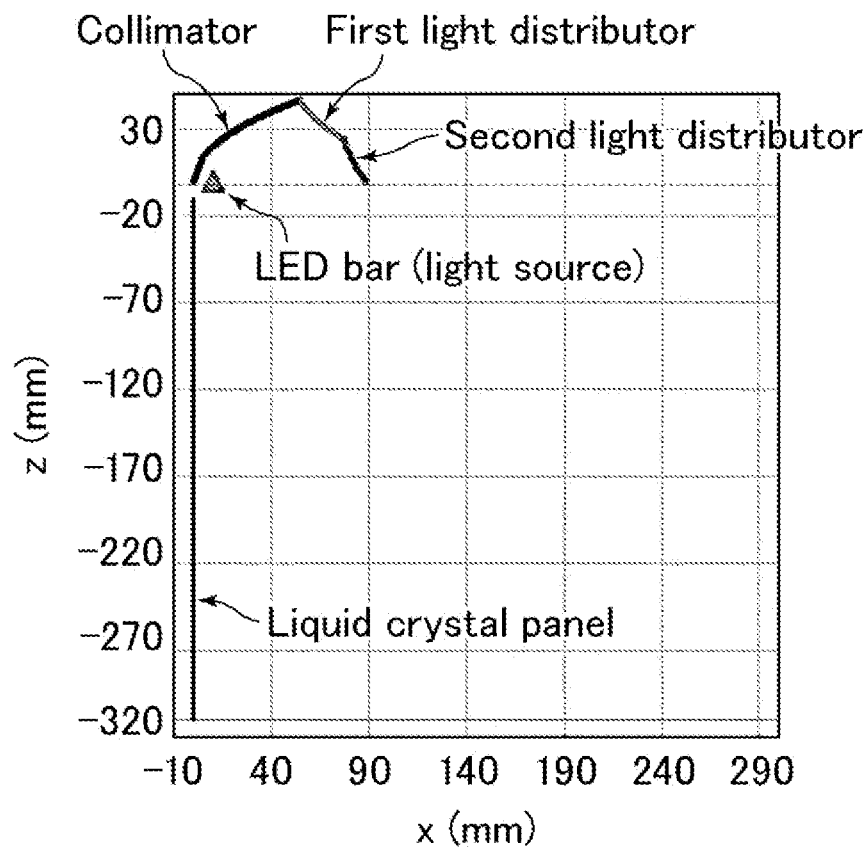
FIG. 16 is a diagram of the arrangement coordinates of the liquid crystal panel and the light source module in the liquid crystal display element of Example 1.

FIG. 16 is a diagram of the arrangement coordinates of the liquid crystal panel and the light source module in the liquid crystal display element of Example 1. FIG. 16 shows the arrangement of the liquid crystal display element 1 of Example 1 observed from a side (cross section). The point of the light source module 20 having the smallest distance relative to the liquid crystal panel 11, i.e., the end point of the mirror 22 is defined as the origin (0, 0), the transverse axis corresponds to the x-axis direction, the vertical axis corresponds to the z-axis direction, and the unit is mm.

The LED bar (light source 21) had module-relative coordinates $(x_1, z_1)$ of (10, 0) and the light source 21 was arranged such that it emitted light parallel to the z-axis direction. The mirror 22 included three components, i.e., the collimator 221, the first light distributor 222, and the second light distributor 223. Provided that the collimator 221 had module-relative coordinates $(x_2, z_2)$, the first light distributor 222 had module-relative coordinates $(x_3, z_3)$, and the second light distributor 223 had module-relative coordinates $(x_4, z_4)$, $z_2=(40 \times x_2)^{0.5}$ was satisfied within the range of $0 \leq x_2 \leq 54.5$; $z_3=-(40 \times (x_3-52.5))^{0.5}+55.6347$ was satisfied within the range of $54.5 \leq x_3 \leq 77$; and $z_4=-(120 \times (x_4-75))^{0.5}+39.8217$ was satisfied within the range of $77 \leq x_4 \leq 88.5$. The area of the active region of the liquid crystal panel 11 was 300 mm in the z-axis direction and 400 mm in the y-axis direction. The xz coordinates of the major axis in the y-axis direction at an upper portion of the screen of the liquid crystal panel 11 were (0, −10), while the xz coordinates of the major axis in the y-axis direction at a lower portion of the screen of the liquid crystal panel 11 were (0, −310).

In the liquid crystal display element 1 of Example 1, light applied to the liquid crystal panel 11 passed through the lower portion of the screen when no voltage was applied to the polymer-dispersed liquid crystal 300 (e.g., applied voltage 0 V) so that no light reached the eyes of a viewer in front of the panel, while the light was emitted through the front surface of the panel when voltage was applied (e.g., applied voltage 8.5 V) so that the light reached the eyes of the viewer in front of the panel.

Evaluation of Example 1 and Comparative Example 1

Figure 17:
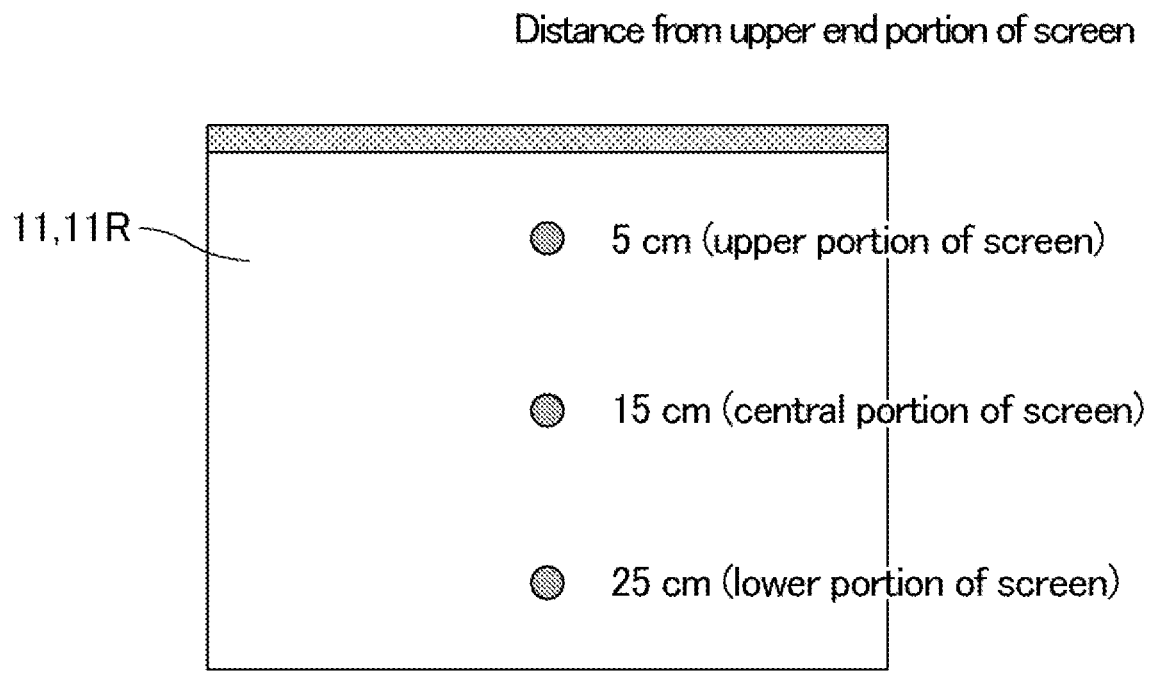
FIG. 17 is a schematic front view of the liquid crystal display element, illustrating an upper portion, central portion, and lower portion of the screen.
Figure 18:
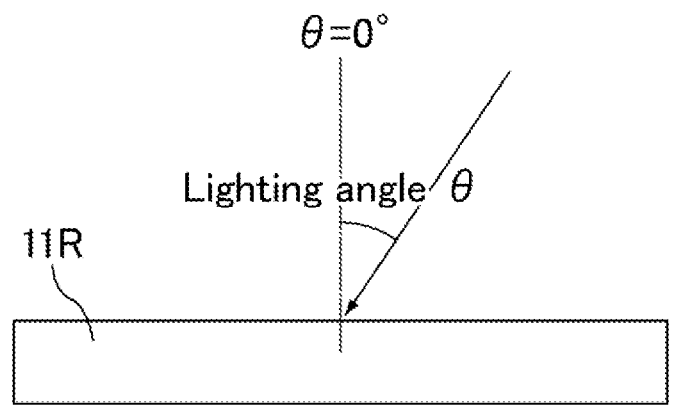
FIG. 18 is a schematic view of a method of measuring the luminance of a liquid crystal panel.
Figure 19:
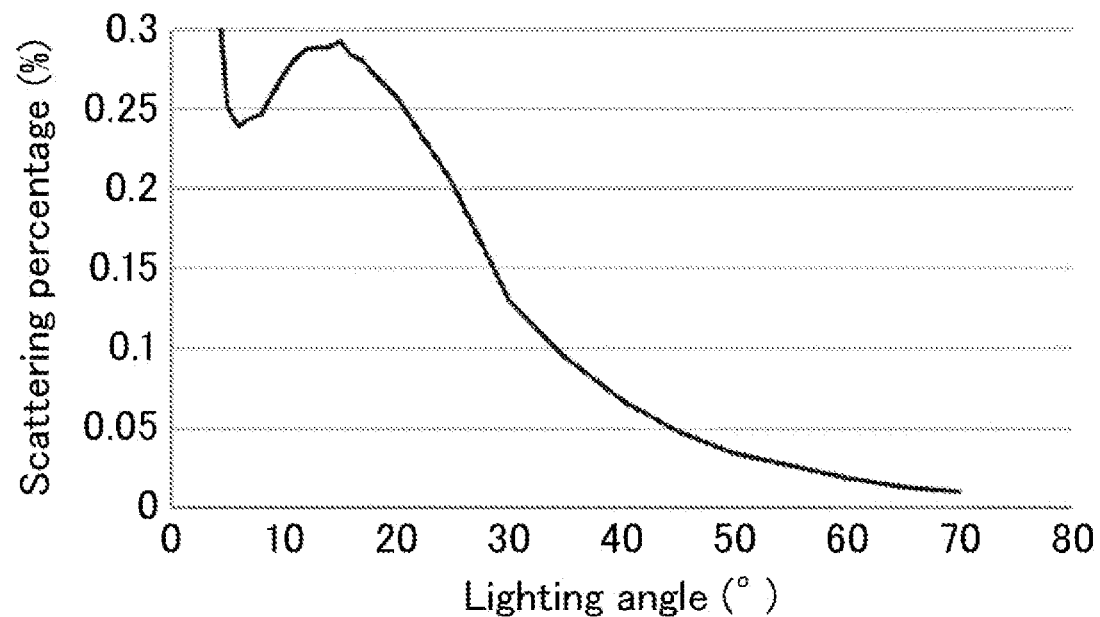
FIG. 19 is a graph showing an example of the results of measuring the luminance of a PDLC liquid crystal panel.
Figure 20:
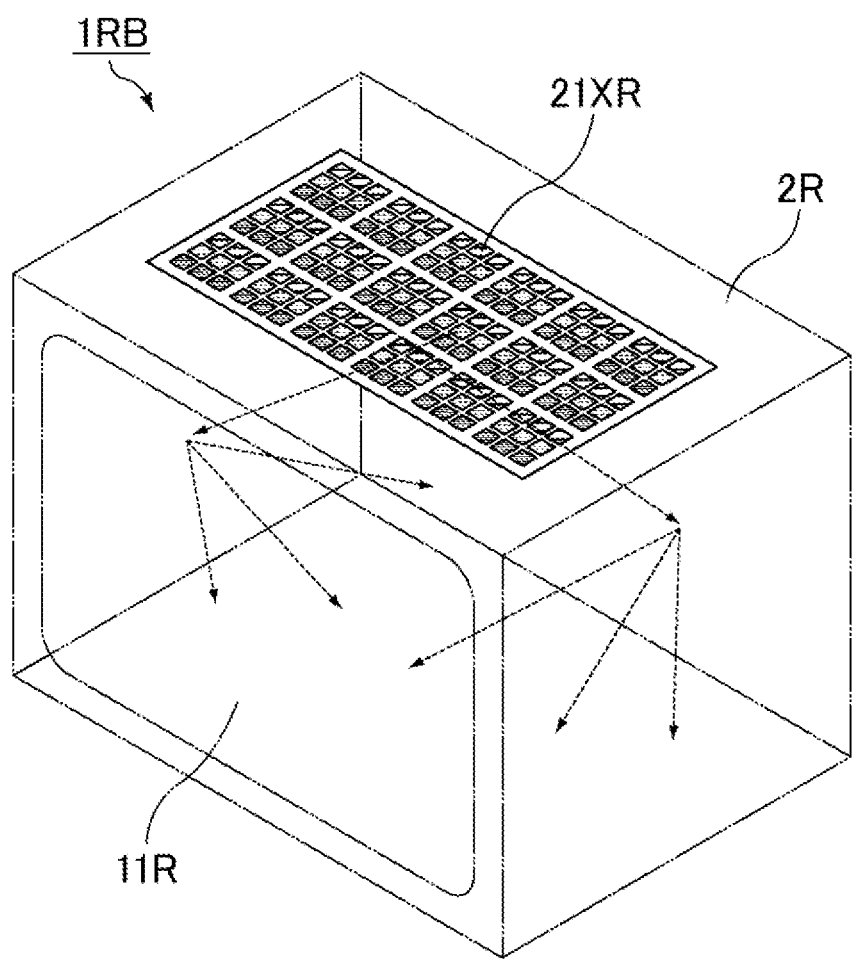
FIG. 20 is a schematic perspective view of an example of a box-type see-through display.

FIG. 17 is a schematic front view of the liquid crystal display element, illustrating an upper portion, central portion, and lower portion of the screen. For the liquid crystal display elements of Example 1 and Comparative Example 1, the luminance at the central portion of the screen, as well as the in-plane luminance ratio at the upper portion, central portion, and lower portion of the screen as shown in FIG. 17 were determined. The results of determining the luminance characteristics with voltage applied to the entire screen of the liquid crystal panel are shown in the following Table 1. The luminance was measured using a luminance meter (SR-UL2) available from Topcon Technohouse Corp. The power of the LED light source was set to the same value in Example 1 and Comparative Example 1.

TABLE 1

|  | Comparative Example 1 (light guiding mode) | Example 1 (light source for spatial light guiding) |
|---|---|---|
| Luminance at central portion of screen (cd/m$^2$) | 67 | 135 |
| In-plane luminance ratio (upper portion:central portion:lower portion) | 1000:100:10 | 60:100:60 |

Table 1 demonstrates that the mirror 22 distributed the light so that the in-plane irradiance distribution was appropriate in Example 1; specifically, the irradiance was high even at a position far from the screen, resulting in a more uniform in-plane luminance and a high luminance at the central portion of the screen.

In contrast, in Comparative Example 1, part of the light reflected on the light guide plate was lost due to diffraction by components such as TFTs. The farther the light is from the LED light source, the greater the loss of the light is. This therefore resulted in a decreased luminance at a region far from the LED light source.

REFERENCE SIGNS LIST 1, 1R1: liquid crystal display element
1B, 1G, 1R: input scale data
1b, 1g, 1r: applied grayscale data
1RB: see-through display
2R: box
4: pixel-forming portion
11, 11R: liquid crystal panel
11A: display portion
11P: back-surface-side main surface
11X, 11Y: end portion
20: light source module
20A: first light source module
20B: second light source module
20C: third light source module
21, 21A, 21B: light source
21BL: blue LED chip
21GL: green LED chip
21RL: red LED chip
21XR: LED light source
22, 22A, 22B, 22C: mirror
23: diffuser
30: air layer 40: thin film transistor (TFT)
42: liquid crystal capacitance
43: auxiliary capacitance
45: auxiliary capacitance electrode
46: pixel capacitance
100: first substrate
100R: TFT substrate
110: first support substrate
120: pixel electrode
200: second substrate
200R: ITO substrate
210: second support substrate
220: common electrode
221: collimator
222: first light distributor
223: second light distributor
300: polymer-dispersed liquid crystal
310: polymer network
320: liquid crystal component
410: first alignment film
420: second alignment film
1000: preprocessing unit
1100: signal separation circuit
1200: data correction circuit
1300(R): red field memory
1300(G): green field memory
1300(B): blue field memory
2000: timing controller
3100: gate driver
3200: source driver
3300: LED driver
DIN: input image signal
DV: digital video signal
GCK: gate clock signal
GSP: gate start pulse signal
GL, GL1 to GLm: gate line
LS: latch strobe signal
S1: LED driver control signal
S2: light source control signal
SCK: source clock signal
SL, SL1 to SLn: source line
SSP: source start pulse signal

What is claimed is:
1. A liquid crystal display element comprising:
a liquid crystal panel containing a polymer-dispersed liquid crystal including a polymer network and a liquid crystal component; and
a light source module comprising a light source adjacent to the liquid crystal panel and a mirror configured to reflect light emitted from the light source toward the liquid crystal panel,
the mirror comprising a collimator configured to collimate a Lambertian light source, a first light distributor, and a second light distributor,
a thickness direction, an in-plane horizontal direction, and an in-plane vertical direction of the liquid crystal panel corresponding, respectively, to an x-axis direction, a y-axis direction, and a z-axis direction,
the collimator being away from the liquid crystal panel in the z-axis direction,
the first light distributor being further away from the liquid crystal panel than the collimator in the x-axis direction, and
the second light distributor being further away from the liquid crystal panel than the first light distributor in the x-axis direction.

2. The liquid crystal display element according to claim 1, wherein the light source module faces a first end portion of paired opposite end portions of the liquid crystal panel.

3. The liquid crystal display element according to claim 2, wherein the light source is a first light source, the mirror is a first mirror, and the light source module is a first light source module,
the liquid crystal display element further comprises a second light source module, the second light source module comprising:
a second light source adjacent to the liquid crystal panel and facing a second end portion of the paired opposite end portions; and
a second mirror configured to reflect light emitted from the second light source toward the liquid crystal panel.

4. The liquid crystal display element according to claim 2, wherein the light source is a first light source, the mirror is a first mirror, and the light source module is a first light source module, and
the liquid crystal display element further comprises a second light source module, the second light source module comprising:
a second mirror adjacent to the liquid crystal panel, facing a second end portion of the paired opposite end portions, and configured to reflect light incident thereon toward the liquid crystal panel; and
no light source.

5. The liquid crystal display element according to claim 1, wherein the mirror comprises a continuous freeform surface mirror.

6. The liquid crystal display element according to claim 1, wherein the mirror has a shape expressed by two or more independent functions.

7. The liquid crystal display element according to claim 1, wherein the mirror has a shape expressed by three or more independent functions.

8. The liquid crystal display element according to claim 1, wherein 30% or more and 60% or less of a total luminous flux collimated is applied to the first light distributor, and 40% or more and 100% or less of a luminous flux collimated and applied to the first light distributor is applied to the liquid crystal panel, and
40% or more and 70% or less of the total luminous flux collimated, which corresponds to a luminous flux collimated and not applied to the first light distributor, is applied to the second light distributor, and 40% or more and 100% or less of a luminous flux collimated and applied to the second light distributor is applied to the liquid crystal panel.

9. The liquid crystal display element according to claim 8, wherein an amount of light applied from the first light distributor to the liquid crystal panel reaches a maximum within a range of 60% from a first end portion of the liquid crystal panel that is adjacent to the light source module, and
an amount of light applied from the second light distributor to the liquid crystal panel reaches a maximum within a range of 50% from a second end portion of the liquid crystal panel that is opposite the first end portion adjacent to the light source module.

10. The liquid crystal display element according to claim 1,
wherein a point of the light source module having a smallest distance relative to the liquid crystal panel has module-relative coordinates (x, z)=(0, 0), the light source module includes a diffuser having a haze of 1% or higher and 40% or lower in a plane satisfying z=0.

11. The liquid crystal display element according to claim 10, wherein the diffuser is provided on a back surface side of the liquid crystal panel.

12. The liquid crystal display element according to claim 1, wherein
the light source module irradiates a back-surface-side main surface of the liquid crystal panel with light from a back-surface-side oblique direction.

13. The liquid crystal display element according to claim 1,
wherein the liquid crystal panel is rectangular and includes a display surface,
a direction from a viewing surface side to a back surface side of the liquid crystal panel, a longitudinal direction of the liquid crystal panel, and a short side direction of the liquid crystal panel correspond, respectively, to the x-axis direction, the y-axis direction, and the z-axis direction when the display surface is observed in the x-axis direction, and
the light source is adjacent to the liquid crystal panel along the y-axis direction of the liquid crystal panel.

14. The liquid crystal display element according to claim 1,
wherein the liquid crystal panel is rectangular and includes a display surface,
a direction from a viewing surface side to a back surface side of the liquid crystal panel, a longitudinal direction of the liquid crystal panel, and a short side direction of the liquid crystal panel correspond, respectively, to the x-axis direction, the y-axis direction, and the z-axis direction when the display surface is observed in the x-axis direction, and
when the display surface of the liquid crystal panel is observed in the x-axis direction, the light source is at a position apart from the liquid crystal panel in the z-axis direction.

* * * * *